(12) United States Patent
Lert et al.

(10) Patent No.: US 12,084,279 B2
(45) Date of Patent: Sep. 10, 2024

(54) CONTROL SYSTEM FOR STORAGE AND RETRIEVAL SYSTEMS

(71) Applicant: Symbotic LLC, Wilmington, MA (US)

(72) Inventors: John Lert, Wakefield, MA (US);
Stephen Toebes, Chelmsford, MA (US);
Robert Sullivan, Wilmington, MA (US);
Foster D. Hinshaw, Cambridge, MA (US);
Nathan Ulrich, Lee, NH (US);
Eric Peters, Carlisle, MA (US)

(73) Assignee: Symbotic LLC, Wilmington, MA (US)

( * ) Notice: Subject to any disclaimer, the term of this patent is extended or adjusted under 35 U.S.C. 154(b) by 0 days.

(21) Appl. No.: 18/187,427

(22) Filed: Mar. 21, 2023

(65) Prior Publication Data

US 2023/0219755 A1    Jul. 13, 2023

Related U.S. Application Data

(63) Continuation of application No. 16/934,657, filed on Jul. 21, 2020, now Pat. No. 11,608,228, which is a
(Continued)

(51) Int. Cl.
*G06F 7/00* (2006.01)
*B65G 1/04* (2006.01)
(Continued)

(52) U.S. Cl.
CPC .......... *B65G 1/0492* (2013.01); *B65G 1/065* (2013.01); *B65G 1/1373* (2013.01);
(Continued)

(58) Field of Classification Search
CPC .... B65G 1/0492; B65G 1/065; B65G 1/1373; B65G 1/1378; B65G 1/045; B65G 1/10;
(Continued)

(56) References Cited

U.S. PATENT DOCUMENTS 2,945,604 A    7/1960    Kroll et al.
2,996,621 A    8/1961    Barrett, Jr.
(Continued)

FOREIGN PATENT DOCUMENTS

DE    4104527    8/1992
DE    20011661    12/2000
(Continued)

OTHER PUBLICATIONS

International Search Report, International Application No. PCT/US2015/065574, dated Feb. 12, 2016.
(Continued)

*Primary Examiner* — Yolanda R Cumbess
(74) *Attorney, Agent, or Firm* — Perman & Green, LLP

(57) ABSTRACT

A warehouse storage and retrieval system including an array of multilevel storage racks having at least one transfer deck, picking isles and storage areas disposed along picking isles, the storage areas being configured to hold differing loads, and a controller including a management module configured to variably size the storage areas of the array of multilevel storage rack modules and assign each of the variably sized storage areas to a corresponding one of the differing loads, wherein the storage and retrieval system is arranged to transport the differing loads for placement in the variably sized storage areas assigned by the controller.

16 Claims, 17 Drawing Sheets

Related U.S. Application Data continuation of application No. 16/653,409, filed on Oct. 15, 2019, now Pat. No. 10,717,599, which is a continuation of application No. 16/051,212, filed on Jul. 31, 2018, now Pat. No. 10,442,622, which is a continuation of application No. 15/716,310, filed on Sep. 26, 2017, now Pat. No. 10,035,649, which is a continuation of application No. 14/733,341, filed on Jun. 8, 2015, now Pat. No. 9,771,217, which is a continuation of application No. 14/089,434, filed on Nov. 25, 2013, now Pat. No. 9,051,120, which is a continuation of application No. 12/757,337, filed on Apr. 9, 2010, now Pat. No. 8,594,835.

(60) Provisional application No. 61/168,349, filed on Apr. 10, 2009.

(51) Int. Cl.
  B65G 1/06 (2006.01)
  B65G 1/137 (2006.01)
  B65G 1/10 (2006.01)
  B65G 1/127 (2006.01)
  B65G 47/57 (2006.01)
  G06Q 10/087 (2023.01)

(52) U.S. Cl.
  CPC ............ B65G 1/1378 (2013.01); B65G 1/045 (2013.01); B65G 1/10 (2013.01); B65G 1/127 (2013.01); B65G 1/137 (2013.01); B65G 1/1371 (2013.01); B65G 47/57 (2013.01); G06Q 10/087 (2013.01); Y10S 901/01 (2013.01)

(58) Field of Classification Search
  CPC ...... B65G 1/127; B65G 1/137; B65G 1/1371; B65G 47/57; B65G 1/0485; B65G 1/04; G06Q 10/087; Y10S 901/01
  USPC ................. 700/213–214, 216, 218, 228, 230
  See application file for complete search history.

(56) References Cited

U.S. PATENT DOCUMENTS

| | | |
|---|---|---|
| 3,161,303 A | 12/1964 | Burrows |
| 3,455,468 A | 7/1969 | Saul |
| 3,554,390 A | 1/1971 | Saul |
| 3,677,421 A | 7/1972 | Kintner |
| 3,737,056 A | 6/1973 | Hathcock, Jr. |
| 3,802,580 A | 4/1974 | Castaldi |
| 3,970,840 A | 7/1976 | De Bruine |
| 4,273,234 A | 6/1981 | Bourgeois |
| 4,395,181 A | 7/1983 | Loomer |
| 4,406,570 A | 9/1983 | Duncan et al. |
| 4,428,708 A | 1/1984 | Burt |
| 4,492,504 A | 1/1985 | Hainsworth |
| 4,678,390 A | 7/1987 | Bonneton et al. |
| 4,679,149 A | 7/1987 | Merz |
| 4,716,530 A | 12/1987 | Ogawa et al. |
| 4,786,229 A | 11/1988 | Henderson |
| 4,811,229 A | 3/1989 | Wilson |
| 4,936,738 A | 6/1990 | Brennan et al. |
| 5,015,145 A | 5/1991 | Angell et al. |
| 5,096,355 A | 3/1992 | Schroder |
| 5,134,353 A | 7/1992 | Kita et al. |
| 5,134,940 A | 8/1992 | Fujita et al. |
| 5,135,344 A | 8/1992 | Kita et al. |
| 5,140,787 A | 8/1992 | Corcoran |
| 5,179,329 A | 1/1993 | Nishikawa et al. |
| 5,238,100 A | 8/1993 | Rose, Jr. et al. |
| 5,271,703 A | 12/1993 | Lindqvist et al. |
| 5,273,392 A | 12/1993 | Bernard, II et al. |
| 5,333,982 A | 8/1994 | Taniwaza et al. |
| 5,379,229 A | 1/1995 | Parson et al. |
| 5,380,139 A | 1/1995 | Pohjonen et al. |
| 5,388,955 A | 2/1995 | Schroder |
| 5,403,147 A | 4/1995 | Tanaka |
| 5,425,612 A | 6/1995 | Ebstein |
| 5,472,309 A | 12/1995 | Bernard, II et al. |
| 5,525,884 A | 6/1996 | Sugiura et al. |
| 5,529,165 A | 6/1996 | Shupert |
| 5,601,395 A | 2/1997 | Lichti, Sr. et al. |
| 5,615,992 A | 4/1997 | Proske et al. |
| 5,718,551 A | 2/1998 | Ebstein |
| 5,764,014 A | 6/1998 | Jakeway et al. |
| 5,801,506 A | 9/1998 | Netzler |
| 5,833,431 A | 11/1998 | Rosse, II et al. |
| 5,839,872 A | 11/1998 | Goto et al. |
| 5,927,926 A | 7/1999 | Yagi et al. |
| 5,988,306 A | 11/1999 | Ooishi |
| 6,036,427 A | 3/2000 | Kita et al. |
| 6,061,607 A | 5/2000 | Bradley et al. |
| 6,149,366 A | 11/2000 | Deandrea |
| 6,158,566 A | 12/2000 | Pollock |
| 6,272,406 B2 | 8/2001 | Alofs et al. |
| 6,325,586 B1 | 12/2001 | Loy |
| 6,341,269 B1 | 1/2002 | Dulaney et al. |
| 6,345,217 B1 | 2/2002 | Zeitler et al. |
| 6,390,756 B1 | 5/2002 | Isaacs et al. |
| 6,391,226 B1 | 5/2002 | Chauvette et al. |
| 6,652,213 B1 | 11/2003 | Mitchell et al. |
| 6,721,638 B2 | 4/2004 | Zeitler |
| 6,748,292 B2 | 6/2004 | Mountz |
| 6,861,154 B2 | 3/2005 | Olson et al. |
| 6,864,489 B2 | 3/2005 | Chen et al. |
| 6,929,440 B1 | 8/2005 | Grond |
| 6,948,899 B2 | 9/2005 | Lee |
| 6,950,722 B2 | 9/2005 | Mountz |
| 7,008,164 B2 | 3/2006 | Rokkaku |
| 7,025,191 B2 | 4/2006 | Lichti, Sr. et al. |
| 7,101,139 B1 | 9/2006 | Benedict |
| 7,266,422 B1 | 9/2007 | Demotte et al. |
| 7,329,081 B2 | 2/2008 | Baker et al. |
| 7,402,018 B2 | 7/2008 | Mountz et al. |
| 7,495,561 B2 | 2/2009 | Bodin et al. |
| 7,671,293 B2 | 3/2010 | Fry et al. |
| 7,686,560 B2 | 3/2010 | Laurin et al. |
| 2002/0029719 A1 | 3/2002 | Matsukawa |
| 2002/0076307 A1 | 6/2002 | Fallin et al. |
| 2003/0033217 A1 | 2/2003 | Cutlip |
| 2003/0200129 A1 | 10/2003 | Klaubauf et al. |
| 2004/0093116 A1 | 5/2004 | Mountz |
| 2004/0238326 A1 | 12/2004 | Lichti, Sr. |
| 2005/0008463 A1 | 1/2005 | Stehr et al. |
| 2005/0035138 A1 | 2/2005 | Guerra |
| 2005/0158154 A1 | 7/2005 | Leerintveld et al. |
| 2006/0104712 A1 | 5/2006 | Bufano et al. |
| 2006/0112034 A1* | 5/2006 | Okamoto ............ G05D 1/0274 706/16 |
| 2006/0210382 A1 | 9/2006 | Mountz et al. |
| 2006/0245858 A1 | 11/2006 | Suess |
| 2006/0257236 A1 | 11/2006 | Stingel, III et al. |
| 2007/0021864 A1 | 1/2007 | Mountz et al. |
| 2007/0068770 A1 | 3/2007 | Koide et al. |
| 2007/0177011 A1 | 8/2007 | Lewin et al. |
| 2007/0288123 A1 | 12/2007 | D Andrea et al. |
| 2007/0290040 A1 | 12/2007 | Wurman et al. |
| 2007/0293978 A1 | 12/2007 | Wurman et al. |
| 2007/0294029 A1* | 12/2007 | D'Andrea ............ G05D 1/0246 701/410 |
| 2008/0001372 A1 | 1/2008 | Hoffman et al. |
| 2008/0044262 A1 | 2/2008 | Kim et al. |
| 2008/0166217 A1 | 7/2008 | Fontana |
| 2008/0215180 A1 | 9/2008 | Kota |
| 2008/0230291 A1 | 9/2008 | Kersting |
| 2008/0269960 A1 | 10/2008 | Kostmann |
| 2009/0074545 A1 | 3/2009 | Lert et al. |
| 2009/0114115 A1 | 5/2009 | Minges |
| 2009/0185884 A1 | 7/2009 | Wurman et al. |
| 2009/0308000 A1 | 12/2009 | Corcoran |
| 2010/0147181 A1 | 6/2010 | Bufano et al. |
| 2010/0322748 A1 | 12/2010 | Lee |

(56) References Cited

U.S. PATENT DOCUMENTS

| | | |
|---|---|---|
| 2011/0106295 A1 | 5/2011 | Miranda et al. |
| 2013/0096735 A1 | 4/2013 | Byford et al. |
| 2013/0245810 A1 | 9/2013 | Sullivan et al. |
| 2014/0056672 A1 | 2/2014 | Mathys et al. |
| 2014/0288696 A1 | 9/2014 | Lert |
| 2015/0158677 A1 | 6/2015 | Philipp et al. |
| 2016/0260158 A1 | 9/2016 | High et al. |

FOREIGN PATENT DOCUMENTS

| | | |
|---|---|---|
| DE | 10142395 | 11/2002 |
| EP | 0499276 | 8/1992 |
| EP | 0737630 | 10/1996 |
| EP | 1598291 | 11/2005 |
| EP | 1627830 | 6/2006 |
| EP | 1775240 | 4/2007 |
| FR | 2730715 | 8/1996 |
| JP | 5389180 | 8/1978 |
| JP | 63037007 | 2/1988 |
| JP | 07187330 | 7/1995 |
| JP | 08133426 | 5/1996 |
| JP | 11180697 | 7/1999 |
| JP | 2000118615 | 4/2000 |
| JP | 2000122720 | 4/2000 |
| JP | 2001171831 | 6/2001 |
| JP | 2001344020 | 12/2001 |
| JP | 2004043109 | 2/2004 |
| JP | 3102245 | 7/2004 |
| JP | 2005138956 | 6/2005 |
| JP | 2009513427 | 4/2009 |
| WO | 9534491 | 12/1995 |
| WO | 2005009324 | 2/2005 |

OTHER PUBLICATIONS

International Search Report, International Application No. PCT/US2010/30669, dated May 28, 2010.

* cited by examiner

CONTROL SYSTEM FOR STORAGE AND RETRIEVAL SYSTEMS

CROSS REFERENCE TO RELATED APPLICATIONS

This application is a continuation of U.S. patent application Ser. No. 16/934,657, filed on Jul. 21, 2020 (now U.S. Pat. No. 11,608,228, issued Mar. 21, 2023), which is a continuation of U.S. patent application Ser. No. 16/653,409, filed on Oct. 15, 2019, (now U.S. Pat. No. 10,717,599, issued on Jul. 21, 2020), which is a continuation of U.S. patent application Ser. No. 16/051,212, filed on Jul. 31, 2018 (now U.S. Pat. No. 10,442,622, issued on Oct. 15, 2019), which is a continuation of U.S. patent application Ser. No. 15/716,310, filed on Sep. 26, 2017, (now U.S. Pat. No. 10,035,649, issued on Jul. 31, 2018), which is a continuation of U.S. patent application Ser. No. 14/733,341, filed on Jun. 8, 2015, (now U.S. Pat. No. 9,771,217, issued on Sep. 26, 2017), which is a continuation of U.S. patent application Ser. No. 14/089,434, filed on Nov. 25, 2013, (now U.S. Pat. No. 9,051,120, issued Jun. 9, 2015), which is a continuation of U.S. patent application Ser. No. 12/757,337, filed Apr. 9, 2010, (now U.S. Pat. No. 8,594,835, issued Nov. 26, 2013), which claims the benefit of U.S. Provisional Patent Application No. 61/168,349 filed on Apr. 10, 2009, the disclosures of which are incorporated herein by reference in their entireties.

This application is related to U.S. patent application Ser. No. 12/757,381, entitled "STORAGE AND RETRIEVAL SYSTEM," filed on Apr. 9, 2010; U.S. patent application Ser. No. 12/757,220, entitled "STORAGE AND RETRIEVAL SYSTEM," filed on Apr. 9, 2010; U.S. patent application Ser. No. 12/757,354, entitled "LIFT INTERFACE FOR STORAGE AND RETRIEVAL SYSTEMS," filed on Apr. 9, 2010; and U.S. patent application Ser. No. 12/757,312, entitled "AUTONOMOUS TRANSPORTS FOR STORAGE AND RETRIEVAL SYSTEMS," filed on Apr. 9, 2010, the disclosures of which are incorporated by reference herein in their entireties.

BACKGROUND

1. Field

The exemplary embodiments generally relate to material handling systems and, more particularly, to automated storage and retrieval systems.

2. Brief Description of Related Developments

Warehouses for storing case units may generally comprise a series of storage racks that are accessible by transport devices such as, for example, fork lifts, carts and elevators that are movable within aisles between or along the storage racks or by other lifting and transporting devices. These transport devices may be automated or manually driven. Generally the case units stored on the storage racks are contained in carriers, for example storage containers such as trays, totes or shipping cases, or on pallets. Generally, incoming pallets to the warehouse (such as from manufacturers) contain shipping containers (e.g. cases) of the same type of goods. Outgoing pallets leaving the warehouse, for example, to retailers have increasingly been made of what may be referred to as mixed pallets. As may be realized, such mixed pallets are made of shipping containers (e.g. totes or cases such as cartons, etc.) containing different types of goods. For example, one case on the mixed pallet may hold grocery products (soup can, soda cans, etc.) and another case on the same pallet may hold cosmetic or household cleaning or electronic products. Indeed some cases may hold different types of products within a single case. Conventional warehousing systems, including conventional automated warehousing systems do not lend themselves to efficient generation of mixed goods pallets. In addition, storing case units in, for example carriers or on pallets generally does not allow for the retrieval of individual case units within those carriers or pallets without transporting the carriers or pallets to a workstation for manual or automated removal of the individual case units.

It would be advantageous to have a storage and retrieval system for efficiently storing and retrieving individual items without containing those items in a carrier or on a pallet.

BRIEF DESCRIPTION OF THE DRAWINGS

The foregoing aspects and other features of the disclosed embodiments are explained in the following description, taken in connection with the accompanying drawings, wherein.

DETAILED DESCRIPTION OF THE EXEMPLARY EMBODIMENT(S)

Figure 1:
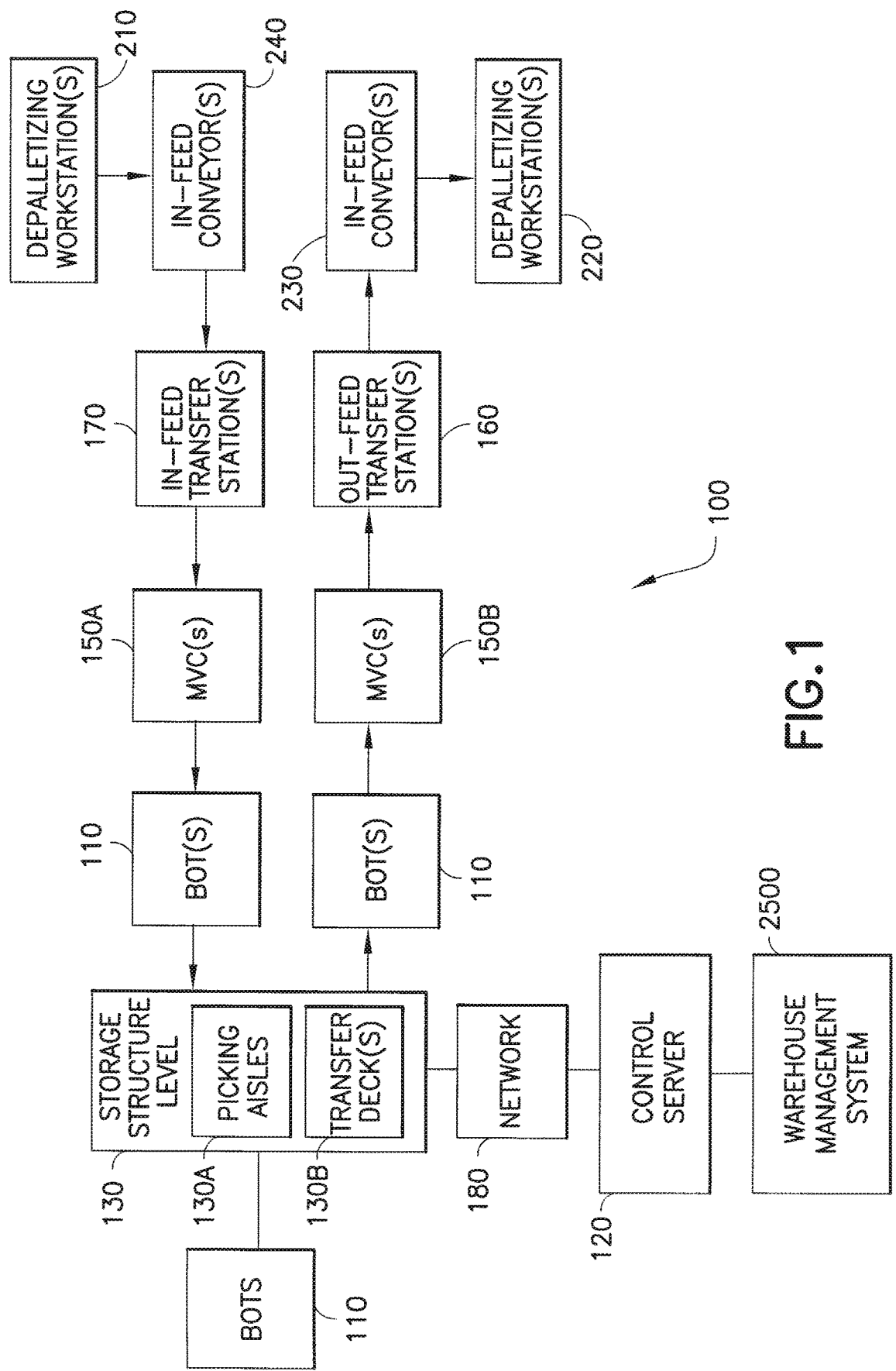
FIG. 1 schematically illustrates an exemplary storage and retrieval system in accordance with an exemplary embodiment.

FIG. 1 generally schematically illustrates a storage and retrieval system 100 in accordance with an exemplary embodiment. Although the disclosed embodiments will be described with reference to the embodiments shown in the drawings, it should be understood that the disclosed embodiments can be embodied in many alternate forms. In addition, any suitable size, shape or type of elements or materials could be used.

In accordance with one exemplary embodiment the storage and retrieval system 100 may operate in a retail distribution center or warehouse to, for example, fulfill orders received from retail stores for case units (where case units as used herein means items not stored in trays, on totes or on pallets, e.g. uncontained). It is noted that the case units may include cases of items (e.g. case of soup cans, boxes of cereal, etc.) or individual items that are adapted to be taken off of or placed on a pallet. In accordance with the exemplary embodiments, shipping cases or case units (e.g. cartons, barrels, boxes, crates, jugs, or any other suitable device for holding items) may have variable sizes and may be used to hold items in shipping and may be configured so they are capable of being palletized for shipping. It is noted that when, for example, pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different case units (e.g. each pallet may hold different types of items—a pallet holds a combination of soup and cereal). In alternate embodiments the storage and retrieval system described herein may be applied to any environment in which items are stored and retrieved.

The storage and retrieval system 100 may be configured for installation in, for example, existing warehouse structures or adapted to new warehouse structures. In one exemplary embodiment, the storage and retrieval system may include in-feed and out-feed transfer stations 170, 160, multilevel vertical conveyors 150A, 150B, a storage structure 130, and a number of autonomous vehicular transport robots 110 (referred to herein as "bots"). In alternate embodiments the storage and retrieval system may also include bot transfer stations that may provide an indirect interface between the bots 110 and the multilevel vertical conveyors 150A, 150B. The in-feed transfer stations 170 and out-feed transfer stations 160 may operate together with their respective multilevel vertical conveyors 150A, 150B for transferring case units to and from one or more levels of the storage structure 130. It is noted that while the multilevel vertical conveyors are described herein as being dedicated inbound conveyors 150A and outbound conveyors 150B, in alternate embodiments each of the conveyors 150A, 150B may be used for both inbound and outbound transfer of case units/items from the storage and retrieval system. As may be realized, the storage and retrieval system 100 may include multiple in-feed and out-feed multilevel vertical conveyors 150A, 150B that are accessible by, for example, bots 110 on each level of the storage and retrieval system 100 so that one or more case unit(s), uncontained or without containment (e.g. case unit(s) are not sealed in trays), can be transferred from a multilevel vertical conveyor 150A, 150B to each storage space on a respective level and from each storage space to any one of the multilevel vertical conveyors 150A, 150B on a respective level. The bots 110 may be configured to transfer the uncontained case units between the storage spaces and the multilevel vertical conveyors with one pick (e.g. substantially directly between the storage spaces and the multilevel vertical conveyors). By way of further example, the designated bot 110 picks the uncontained case unit(s) from a shelf of a multilevel vertical conveyor, transports the uncontained case unit(s) to a predetermined storage area of the storage structure 130 and places the uncontained case unit(s) in the predetermined storage area (and vice versa).

The bots 110 may be configured to place case units, such as the above described retail merchandise, into picking stock in the one or more levels of the storage structure 130 and then selectively retrieve ordered case units for shipping the ordered case units to, for example, a store or other suitable location. In one exemplary embodiment, the bots 110 may interface directly with the multilevel vertical conveyors 150A, 150B through, for example, extension of a bot transfer arm relative to a frame of the bot 110. The bot transfer arm may have extendable fingers for interfacing with slatted or fingered support shelves of the multilevel vertical conveyors as described in U.S. patent application Ser. No. 12/757,312, entitled "AUTONOMOUS TRANSPORTS FOR STORAGE AND RETRIEVAL SYSTEMS," previously incorporated herein by reference in its entirety.

In one exemplary embodiment, the storage and retrieval system 100 may include a bot positioning system for positioning the bot adjacent the shelves of the multilevel vertical conveyors 150A, 150B for picking/placing a desired pickface (e.g. one or more case units as described in greater detail below) from/to a predetermined one of the shelves (e.g. the bot 110 is positioned so as to be aligned with the pickface). The bot positioning system may also be configured to correlate the extension of the bot transfer arm with the movement (e.g. speed and location) of the multilevel vertical conveyor shelves so that the transfer arm is extended and retracted to remove (or place) pickfaces from predetermined shelves of the multilevel vertical conveyors 150A, 150B. For exemplary purposes only, the bot 110 may be instructed by, for example, control server 120 or any other suitable control device of the storage and retrieval system to extend the bot transfer arm into the path of travel of the pickface. As the pickface is carried by the multilevel vertical conveyor 150A, fingers of the bot transfer arm pass through the fingers of the shelf for transferring the pickface from the shelf to the transfer arm (e.g. the pickface is lifted from the fingers via relative movement of the shelf and the transfer arm).

The storage structure 130 may include multiple levels of storage rack modules where each level includes an array of storage spaces (arrayed on the multiple levels and in multiple rows on each level), picking aisles 130A formed between the rows of storage spaces, and transfer decks 130B. The picking aisles 130A and transfer decks 130B being arranged for allowing the bots 110 to traverse respective levels of the storage structure 130 for placing case units into the picking stock and then selectively retrieve ordered case units for shipping the ordered items to, for example, a store or other suitable location. As may be realized, the storage and retrieval system may be configured to allow random accessibility to the storage spaces as will be described in greater detail below. For example, all storage spaces in the storage structure 130 may be treated substantially equally when determining which storage spaces are to be used when picking and placing case units from/to the storage structure 130 such that any storage space of sufficient size can be used to store case units. The storage structure 130 of the exemplary embodiments may also be arranged such that there is no vertical or horizontal array partitioning of the storage structure. For example, each multilevel vertical conveyor 150A, 150B is common to all storage spaces (e.g. the array of storage spaces) in the storage structure 130 such that any bot 110 can access each storage space and any multilevel vertical conveyor 150A, 150B can receive case units from any storage space on any level so that the multiple levels in the array of storage spaces substantially act as a single level (e.g. no vertical partitioning). The multilevel vertical conveyors 150A, 150B can also receive case units from any storage space on any level of the storage structure 130 (e.g. no horizontal partitioning).

The storage structure 130 may also include charging stations (not shown) for replenishing, for example, a battery pack of the bots 110. In one exemplary embodiment, the charging stations may be located at, for example, a transfer station so that the bot can substantially simultaneously transfer items between, for example, the bot and a multilevel vertical conveyor 150A, 150B while being charged.

The bots 110 and other suitable features of the storage and retrieval system 100 may be controlled by, for example, one or more central system control computers (e.g. control server) 120 through, for example, any suitable network 180. The network 180 may be a wired network, a wireless network or a combination of a wireless and wired network using any suitable type and/or number of communication protocols. It is noted that, in one exemplary embodiment, the system control server 120 may be configured to manage and coordinate the overall operation of the storage and retrieval system 100 and interface with, for example, a warehouse management system, which in turn manages the warehouse facility as a whole.

Figure 2:
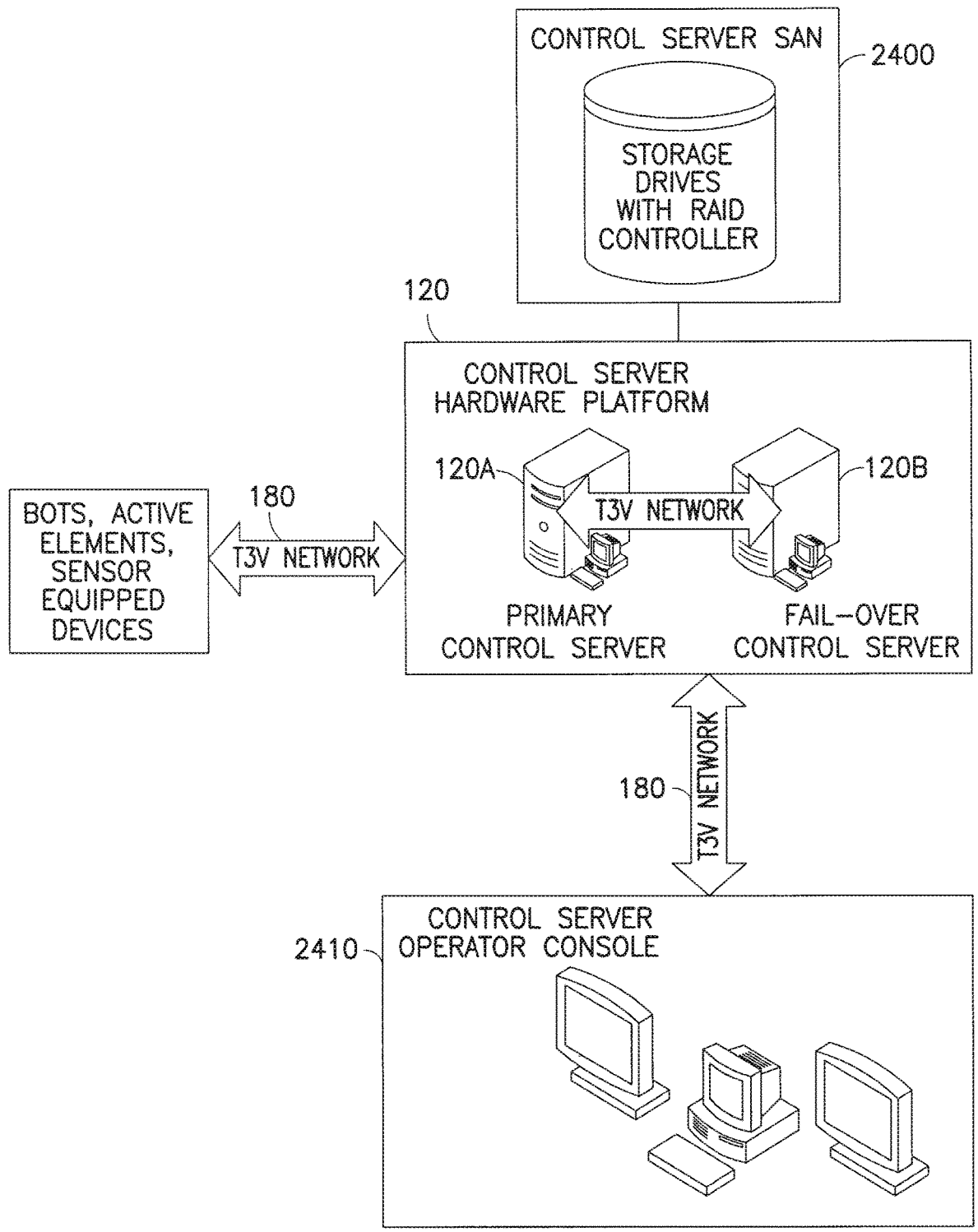
FIG. 2 schematically illustrates a control system of a storage and retrieval system in accordance with an exemplary embodiment.
Figure 3:
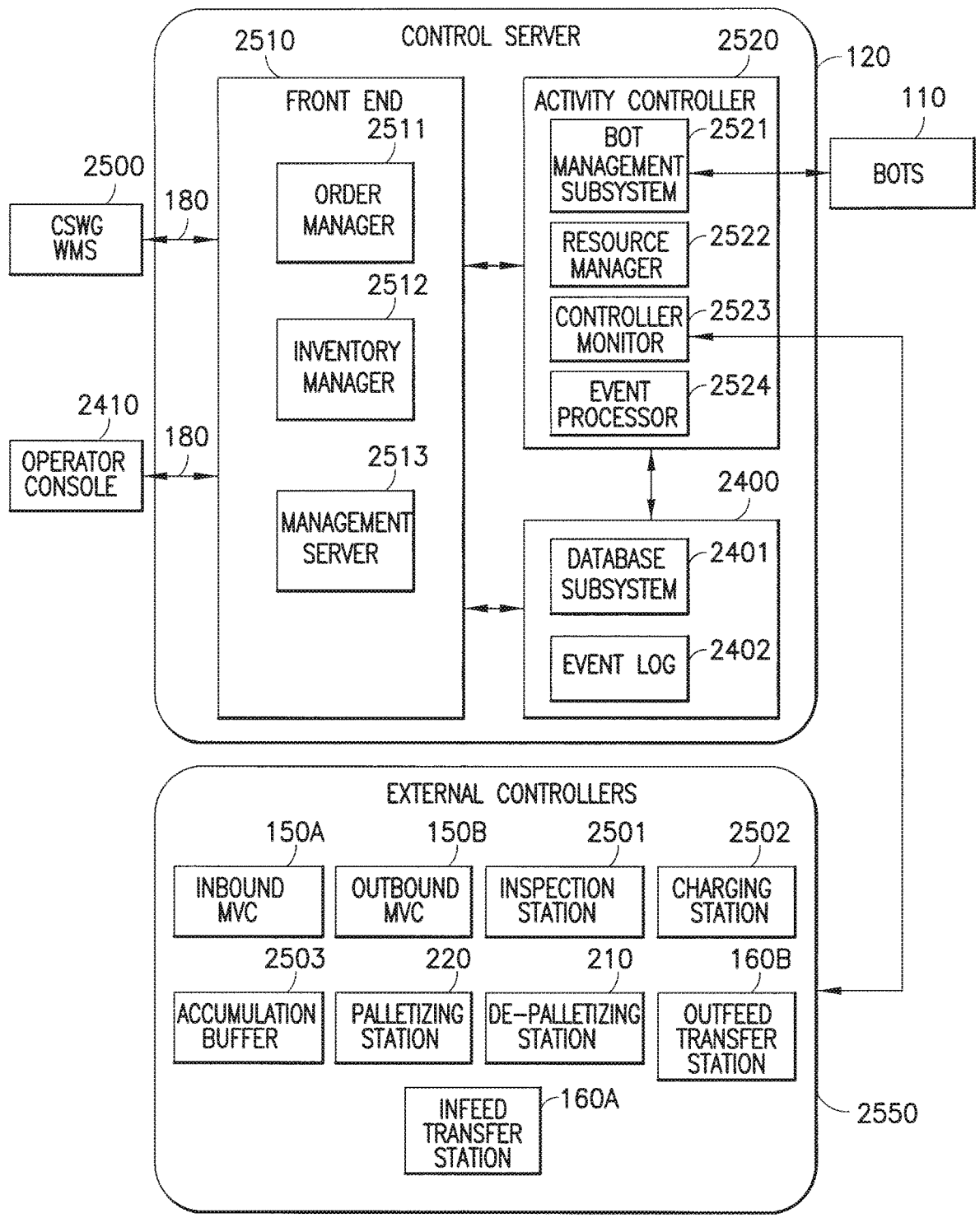
FIG. 3 illustrates a portion of the control system of FIG. 2 in accordance with an exemplary embodiment.

As described above, the components of the storage and retrieval system described herein are in communication with and/or controlled by control server 120 as shown in FIGS. 2 and 3. The control server 120 may include a collection of substantially concurrently running programs that are configured to manage the storage and retrieval system 100 including, for exemplary purposes only, controlling, scheduling and monitoring the activities of all active system components, managing inventory and pickfaces, and interfacing with the warehouse management system 2500. The active system components may be the physical entities that act upon the items to be stored and retrieved. The active system components may include, as a non-limiting example, items such as bots, in-feed and out-feed stations, multilevel vertical conveyors, the network and user interface terminals.

It is noted that a "pickface" as used herein may comprise one or more uncontained case units and may correspond to the load of a single bot 110 that is placed in a space on a storage shelf. Conversely, the bot load may be established based on a pickface determination. The storage shelf may hold a set of one or more merchandise items (e.g. case units) placed one behind the other on the storage shelf to be used in pick transactions for filling customer orders. As may be realized, the space envelope or area planform of each pickface may be different. By way of example, uncontained cases, such as those directly transported by the multilevel vertical conveyors have various different sizes (e.g. differing dimensions). Also, as noted each pickface may include one or more uncontained cases. Thus, the length and width of each pickface carried by the multilevel vertical conveyors may be different. In one example, all case units in a given pickface are of the same stock keeping unit (SKU) and originally from the same pallet. In alternate embodiments, each pickface may include any suitable items. As may be realized the determination of the pickfaces may be variable within the storage and retrieval system such that the size and locations of the pickface are dynamically changeable. It is also noted that interfacing with the warehouse management system 2500 allows the control server 120 to receive and execute pallet orders and to submit and execute replenishment orders as will be described below.

Figure 13:
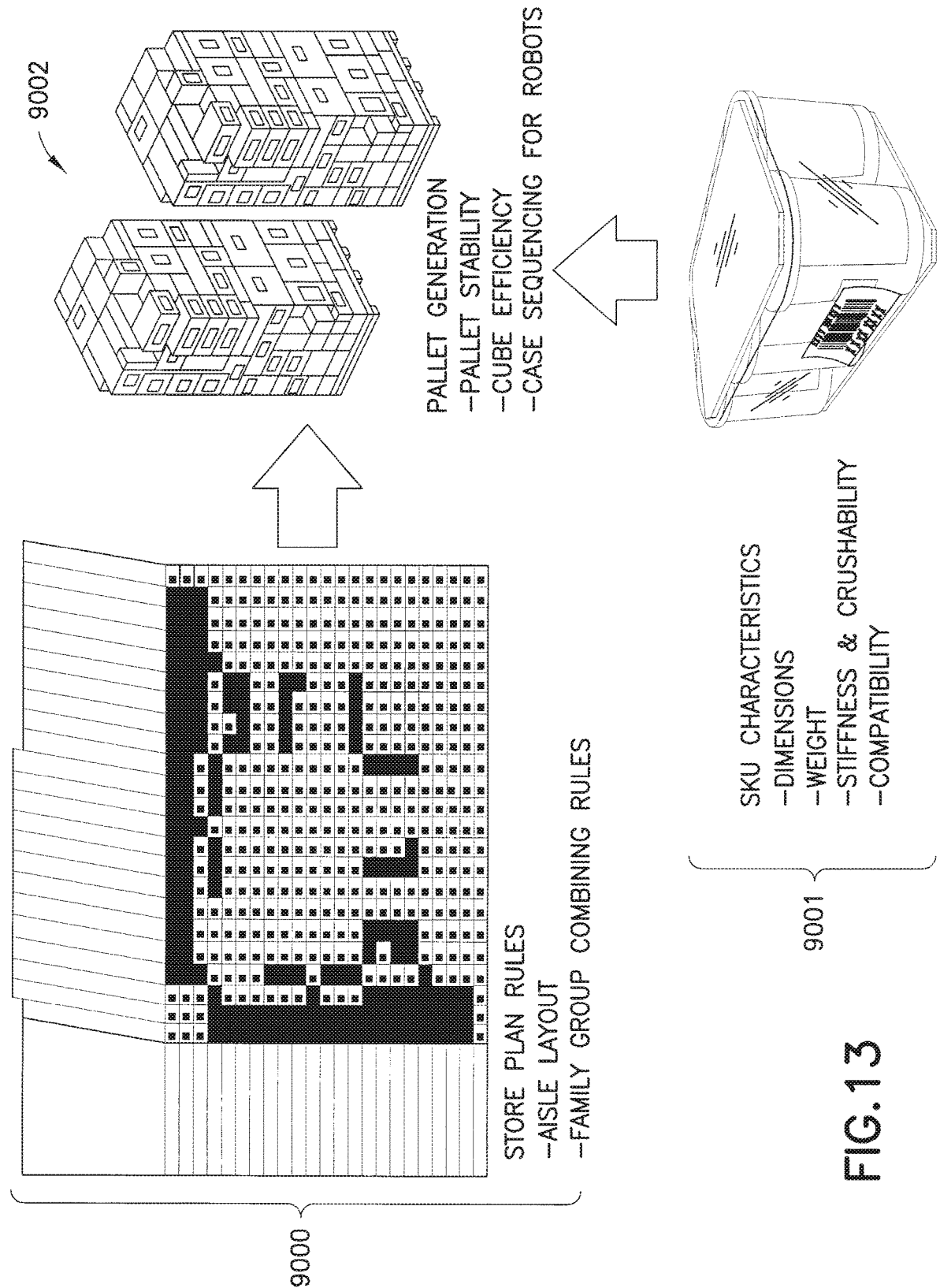
FIG. 13 is a schematic illustration of a method in accordance with an exemplary embodiment.

The control server 120 may be configured to order the removal of case units from the storage and retrieval system for any suitable purpose, in addition to order fulfillment, such as, for example, when case units are damaged, recalled or an expiration date of the case units has expired. In one exemplary embodiment, the control server 120 may be configured to give preference to case units that are closer to their expiration date when fulfilling orders so those case units are removed from the storage and retrieval system before similar case units (e.g. with the same SKU) having later expiration dates. In the exemplary embodiments, the distribution (e.g. sortation) of case units in the storage and retrieval system is such that the case units can be provided for delivery to a palletizing station in any suitable order at any desired rate using only two sortation sequences. The control server 120 may be configured to fulfill orders so that the case units are provided by the bots 110 to respective multilevel vertical conveyors 150B in a first predetermined sequence (e.g. a first sortation of items) and then removed from the respective multilevel vertical conveyors 150B in a second predetermined sequence (e.g. a second sortation of items) so that the case units may be placed on pallets (or other suitable shipping containers/devices) in a predetermined order. For example, in the first sortation of case units the bots 110 may pick respective pickfaces (e.g. one or more case units) in any order. The bots 110 may traverse the picking aisles and transfer deck (e.g. circulate around the transfer deck) with the pickface until a predetermined time when the pickface is to be delivered to a predetermined multilevel vertical conveyor 150B. In the second sortation of case units, once the pickfaces are on the multilevel vertical conveyor 150B the pickfaces may circulate around the conveyor until a predetermined time when the pickfaces are to be delivered to the out-feed transfer station 160. Referring also to FIG. 13, it is noted that the order of pickfaces delivered to the pallets may correspond to, for example, store plan rules 9000. The store plan rules 9000 may incorporate, for example, an aisle layout in the customer's store or a family group of items corresponding to, for example, a particular location in the store where the pallet will be unloaded or a type of item. The order of pickfaces delivered to the pallets may also correspond to a durability of the case units. For example, crushable items may be delivered to the pallet after heavier more durable items are delivered to the pallet.

The control server 120 in combination with the structural/mechanical architecture of the storage and retrieval system 100 enables maximum load balancing. As described herein, the storage spaces/storage locations are decoupled from the transport of the case units through the storage and retrieval system. For example, the storage volume (e.g. the distribution of case units in storage) is independent of and does not affect throughput of the case units through the storage and retrieval system. The storage array space may be substantially uniformly distributed with respect to output. The horizontal sortation (at each level) and high speed bots 110 and the vertical sortation by the multilevel vertical conveyors 150B substantially creates a storage array space that is substantially uniformly distributed relative to an output location from the storage array (e.g. an out-feed transfer station 160 of a multilevel vertical conveyor 150B). The substantially uniformly distributed storage space array also allows case units to be output at a desired substantially constant rate from each out-feed transfer station 160 such that the case units are provided in any desired order. To effect the maximum load balancing, the control architecture of the control server 120 may be such that the control server 120 does not relate the storage spaces within the storage structure 130 (e.g. the storage array) to the multilevel vertical conveyors 150B based on a geographical location of the storage spaces (which would result in a virtual partitioning of the storage spaces) relative to the multilevel vertical conveyors 150B (e.g. the closest storage spaces to the multilevel vertical conveyor are not allocated to cases moving from/to that multilevel vertical conveyor). Rather, the control server 120 may map the storage spaces uniformly to each multilevel vertical conveyor 150B and then select bots 110, storage locations and output multilevel vertical conveyor 150B shelf placement so that case units from any location in the storage structure come out from any desired multilevel vertical conveyor output (e.g. at the out-feed transfer stations) at a predetermined substantially constant rate in a desired order.

The control server 120 may include one or more server computers 120A, 120B and a storage system or memory 2400. In alternate embodiments the control server 120 may have any suitable configuration. In one exemplary embodiment, the server computers 120A, 120B may be configured substantially identically to each other where one server computer 120A is designated as a primary server and the other server computer 120B is designated as a secondary server. In normal operation the storage and retrieval system, such as storage and retrieval system 100, is substantially controlled by the primary server computer 120A. In the event of a failure of the primary server computer 120A, the secondary server computer 120B may be configured to assume operation of the storage and retrieval system 100 in any suitable manner. For example, the secondary server computer 120B may be configured to initialize itself with operating information stored in databases 2401 (FIG. 3) of, for example the storage system 2400. In alternate embodiments the secondary server computer 120B may be configured to reconstruct the operational databases based on, for example, database snap-shots or log files, reboot and then initialize itself from the restored databases. While only two server computers 120A, 120B are shown, in alternate embodiments there may be any suitable number of server computers connected to each other so that there are any suitable number of levels of redundancy. In one exemplary embodiment, the control server 120 may include or be coupled to any suitable number of host computers, where each of the host computers is configured to operate one or more levels of the storage structure 130. In the event of a host computer failure, the control server 120 may be configured to assign operation of the one or more levels of the failed host computer to another host computer so that the storage and retrieval system operates substantially uninterrupted. In alternate embodiments, the control server 120 may be configured to assume operational control over the one or more levels of the failed host computer.

The storage system 2400 of the control server 120 may be physically separated from the server computers 120A, 120B. In one exemplary embodiment, the storage system 2400 may be located in the same facility as the control server 120 while in other alternate embodiments the storage system 2400 may be located off-site from the facility in which the control servers 120A, 120B are located. In still other alternate embodiments, the storage system may be integral to one or more of the server computers 120A, 120B. The storage system 2400 may be configured with any suitable number of storage locations for providing data redundancy for holding operational databases and other runtime data. The control server 120 may be configured to access, update or otherwise manage the operational databases 2401 and other runtime data (such as for example, event logs 2402 (FIG. 3) or other suitable data) in any suitable manner and for any suitable purposes. The control server 120 may also be configured to record a maintenance history for each component (e.g. bots, transfer stations, conveyors, etc.) of the storage and retrieval system. In the case of the bots 110, each bot may be configured to send the control server 120 information pertaining to the maintenance of the bot (e.g. when the bot is charged, the distance traveled by the bot, repair information or any other suitable information) at any suitable time intervals. In other exemplary embodiments, the control server 120 may request maintenance information from the bots 110.

The control server 120 may be configured to communicate with the active system components of the storage and retrieval system 100 through the network 180. As described above, the network 180 may be a wired network, a wireless network, or a combination of wired and wireless networks. In one exemplary embodiment, all fixedly located components of the storage and retrieval system 100 may be connected to the control server 120 through a wired portion of network 180 while the movably located components of the storage and retrieval system (such as e.g. the bots 110) may be connected to the control server through a wireless portion of the network 180. In alternate embodiments fixed elements may be connected to the control server 120 through wireless communication. In still other alternate embodiments the movable elements may be connected to the control server 120 through any suitable wired communications.

The network 180 may be a single physical network or be divided into separate physical networks. For example, in one exemplary embodiment, each level of the storage structure 130 may have its own individual communication network, which in turn communicates with the control server 120. Each individual communication network may operate on, for example, a different communication frequency than other different ones of the individual communication networks. In other exemplary embodiments, groups of levels (e.g. one or more levels) of the storage structure 130 may share individual networks, which are in turn in communication with the control server 120. It is noted that the control server 120 may be configured to communicate with the one or more communication networks using a shared network or one or more private networks.

In one exemplary embodiment, as can be seen in FIG. 3, the control server 120 includes a front end 2510 and an activity controller 2520. It is noted that while the control server 120 is described as having the configuration shown in FIG. 3, in alternate embodiments the control server 120 may have any suitable configuration. In this exemplary embodiment, the front end 2510 may include any suitable programs or modules for carrying out the activities of the storage and retrieval system. As a non-limiting example, the front end 2510 may include an order manager 2511, an inventory manager 2512 and a management server 2513. The order manager 2511 may be configured to process orders submitted by the warehouse management system 2500.

The inventory manager 2512 may be configured to provide inventory services to any suitable components of the storage and retrieval system 100 and/or the warehouse management system 2500. The management server 2513 may be configured to monitor the processes of the storage and retrieval system 100. The activity controller 2520 may include any suitable programs or modules for controlling the activities of the storage and retrieval system 100. For example, the activity controller 2520 may include a bot management subsystem 2521, a resource manager 2522, a controller monitor 2523 and an event processor 2524. The bot management subsystem 2521 may be configured to manage bot movement and transport activity. The resource manager 2522 may be configured to manage the activities of the active and passive (e.g. bot charging stations, etc.) components of the storage and retrieval system (which in alternate embodiments may include bot activity). The controller monitor 2523 may be configured to monitor various external controllers 2550 for operating one or more active components such as, for example, components 150A, 150B, 160A, 160B, 210, 220, 2501, 2503 of the storage and retrieval system 100. The event processor 2524 may be configured to monitor events such as picking or placing of case units within the storage structure 130, available storage locations, active bots, or any other suitable events and update one or more databases 2401 and/or event logs 2402 accordingly.

In one exemplary embodiment one or more user interface terminals or operator consoles 2410 may be connected to the control server 120 in any suitable manner, such as through, for example, network 180. In one exemplary embodiment, the user interface terminals 2410 may be substantially similar to the computer workstations described in, for exemplary purposes only, U.S. patent application Ser. No. 12/757,354, entitled "LIFT INTERFACE FOR STORAGE AND RETRIEVAL SYSTEMS," previously incorporated herein by reference in its entirety. The one or more user interface terminals 2410 may be configured to allow an operator of the storage and retrieval system 100 to control one or more aspects of the storage and retrieval system 100. In one exemplary embodiment, one or more of the user interface terminals 2410 may allow for manual entry/modification/cancellation of customer orders and replenishment orders. In another example, the user interface terminals 2410 may allow for inspection, modification or otherwise accessing/entering data within the databases of the system 100 such as, for example, the databases maintained by the inventory manager 2512. One or more of the user interface terminals 2410 may allow an operator to graphically view inventory tables and provide a mechanism for specifying criteria for which case units to display (e.g. showing information for case units with a specified SKU, information about a SKU, how full a specified storage level is, the status of pick or replenishment orders, or any other suitable information) to the user of the user interface terminal 2410. One or more of the user interface terminals 2410 may be configured to allow for the display of current order, historical order and/or resource data. For example, the historical data may include the origins of a specified item in storage, fulfilled orders or other suitable historical data (which may include historical data pertaining to the storage and retrieval system components). Current order data may include, for example, current order status, order placement dates, item SKUs and quantities or any other suitable information pertaining to current orders. The resource data may include, for example, any suitable information about the active or passive resources within the storage and retrieval system. The user interface terminals 2410 may be configured to allow generation of any suitable reports 2699 (FIG. 4) pertaining to the operation of the storage and retrieval system 100. The user interface terminals 2410 may provide a "real time" or up to date representation of the picking structure. In one example, the picking structure representation may be a graphical representation presented on, for example, a display of the user interface terminal 2410 indicating for example, a status of one or more components of the storage and retrieval system. For example, a graphical layout of the entire storage and retrieval system 100 may be displayed such that a location of the bots 110 for each level is shown, the case units in each storage slot are shown, the position of case units being transported within the storage structure are shown or any other suitable graphical information pertaining to the operation of the storage and retrieval system 100 may be shown. One or more of the user interface terminals 2410 may be configured such that an operator can change a status of the storage and retrieval system resources, such as, for exemplary purposes only, take an aisle, conveyor and/or bot (and/or any other suitable system resource) out of service or place a system resource back in service as well as add new resources to (and/or remove resources from) the system 100.

Figure 4:
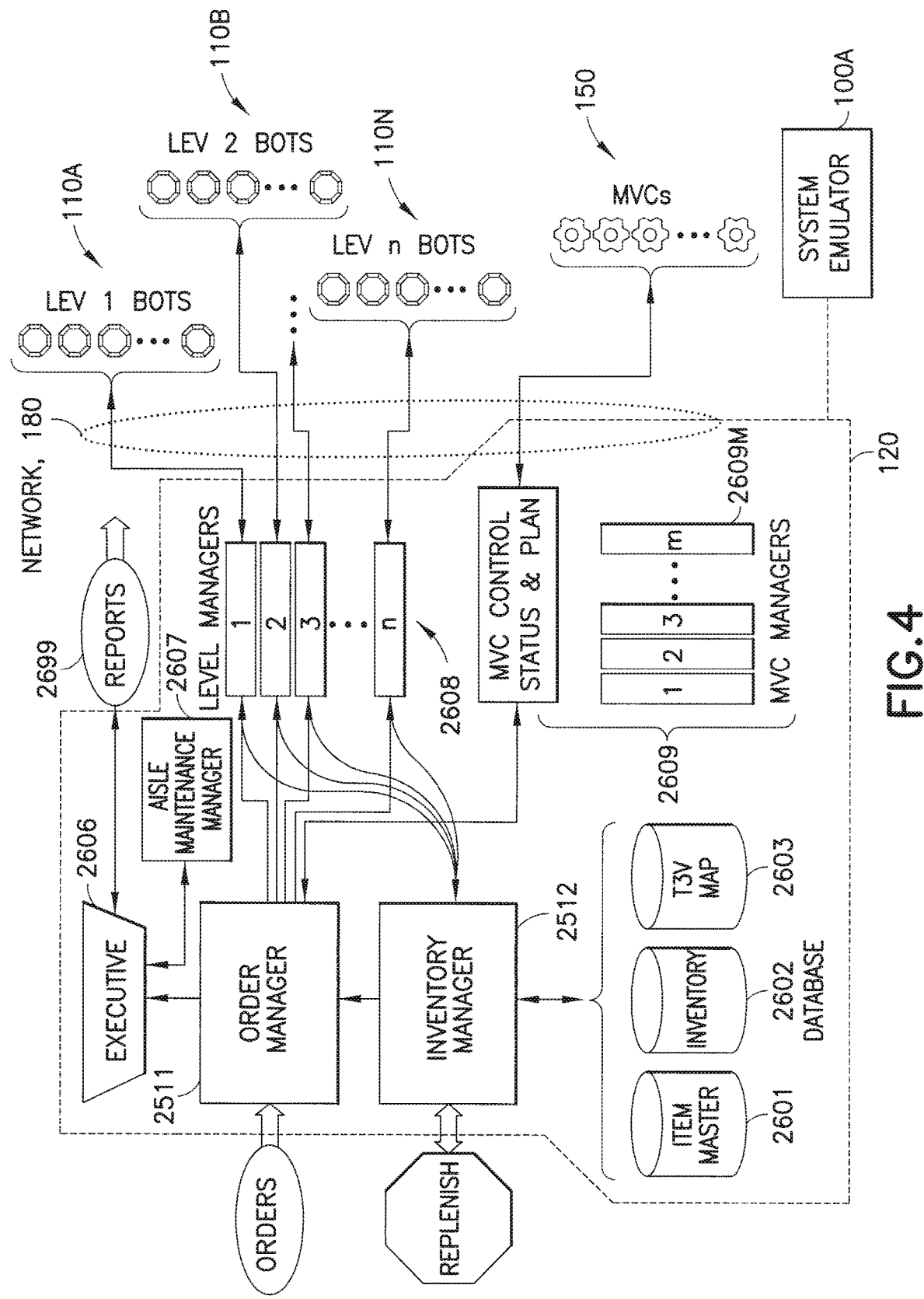
FIG. 4 illustrates a control schematic for a storage and retrieval system in accordance with an exemplary embodiment.

Referring also to FIG. 4, an exemplary operation of the storage and retrieval system will be described in accordance with an exemplary embodiment. The warehouse management system 2500 receives a customer order and examines the order to determine which case units in the order can be fulfilled by the storage and retrieval system 100. Any suitable portion of the order that can be fulfilled by the storage and retrieval system 100 is forwarded to the control server 120 by the warehouse management system 2500. It is noted that portions of the order that are not filled by the storage and retrieval system may be fulfilled manually such that the storage and retrieval system is capable of partial pallet builds. For exemplary purposes only, an order where case units are requested to be picked from the storage and retrieval system 100 and placed onto one or more pallets may be called a "pallet order". Conversely, orders issued by the storage and retrieval system 100 to replenish case units into the storage and retrieval system 100 may be called, for exemplary purposes "replenishment orders". The orders may be broken down into tasks for the bots 110 to execute. For exemplary purposes only, a bot task which is part of a pallet order may be called a picking task and a bot task that is part of a replenishment order may be called a put away task.

Figure 14:
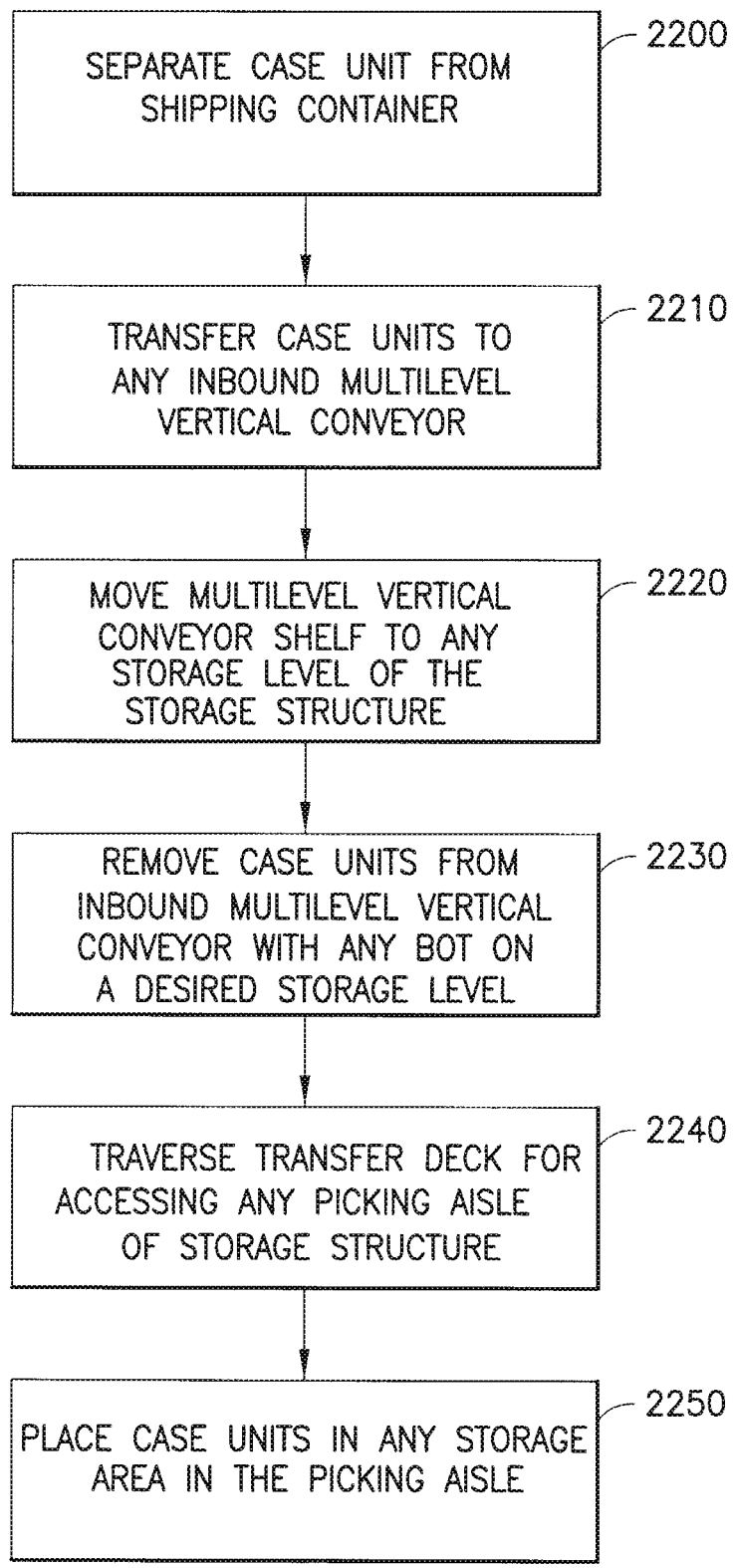
FIGS. 14 and 15 are flow diagrams of exemplary methods in accordance with the exemplary embodiments.
Figure 15:
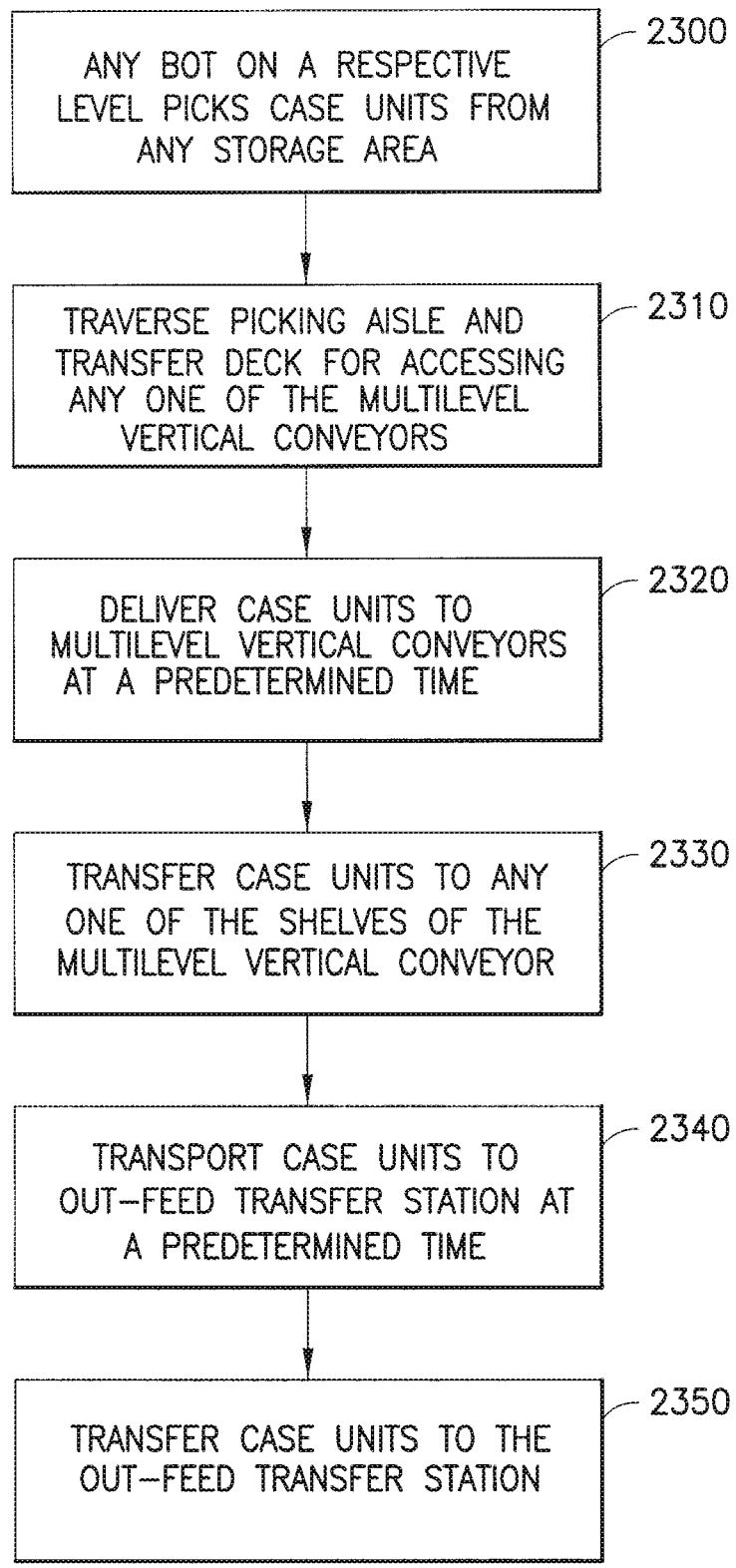

Referring again to FIG. 1, as an exemplary overview of an order fulfillment process including both replenishment and pallet orders, case units for replenishing the picking stock are input at, for example, depalletizing workstations 210 (so that case units bundled together on pallets or other suitable container-like transport supports) are separated and individually carried on, for example, conveyors 240 or other suitable transfer mechanisms (e.g. manned or automated carts, etc.) to the in-feed transfer stations 170 (Block 2200, FIG. 14). The depalletizing workstations 210 may be configured to, for exemplary purposes only, pick layers from the pallets and convert each layer of case units from the pallet into a stream of case units going into the storage and retrieval system 100. The depalletizing workstations 210 may include any suitable features, such as measurement equipment for determining a size of the case units removed from the pallet so that the case units may be placed on an appropriate or predetermined level of the storage structure 130. It is noted that the height of the levels of the storage structure 130 may be non-uniform such that the height of one or more levels is greater than or smaller than the height of other levels in the storage structure 130. The in-feed transfer stations 170 load the individual case units (which form pickfaces) onto respective multilevel vertical conveyors 150A, which carry the pickfaces to the predetermined level of the storage structure 130 (Blocks 2210 and 2220, FIG. 14). The bots 110 located on the predetermined level of the storage structure 130 interface with the multilevel vertical conveyor 150A for removing the individual pickfaces from the multilevel vertical conveyor 150A (Block 2230, FIG. 14). The bots 110 assigned to the predetermined level traverse the transfer deck(s) for accessing any picking aisle for transferring the pickfaces to any predetermined storage module of the storage structure 130 (Blocks 2240 and 2250, FIG. 14). When an order for individual case units is made the bots 110 retrieve the corresponding pickfaces from a designated storage module of the storage structure 130 and transfer the ordered case units (e.g. pickfaces) to multilevel vertical conveyors 150B (Blocks 2300 and 2310, FIG. 15). It is noted that the control server 120, for example, may schedule the timing at which the bots 110 transfer their loads to a predetermined shelf of the respective multilevel vertical conveyor 150B so that each case arrives at the palletizing workstations 160 in a predetermined order or sequence (e.g. time) where the sequence corresponds to a sequence for building the outbound pallet or for otherwise sorting the picked items, as will be described in greater detail below (Blocks 2320 and 2330, FIG. 15). The multilevel vertical conveyor 150B transports the pickfaces to the out-feed transfer stations 160 where the pickfaces are transported to patelletizing workstations 220 by conveyors 230 where the case unit(s) that make up the pickface are placed on outbound pallets (or other suitable container-like transport supports) for shipping to a customer (Blocks 2340 and 2350, FIG. 15). The out-feed transfer stations 160 and the palletizing workstations 220 may be referred to collectively as an order assembly station. As may be realized, the storage and retrieval system allows for ordering mixed case units of any suitable quantity without having to pick and transport, for example, entire trays, totes or pallets of items to and from the storage structure 130.

Figure 5:
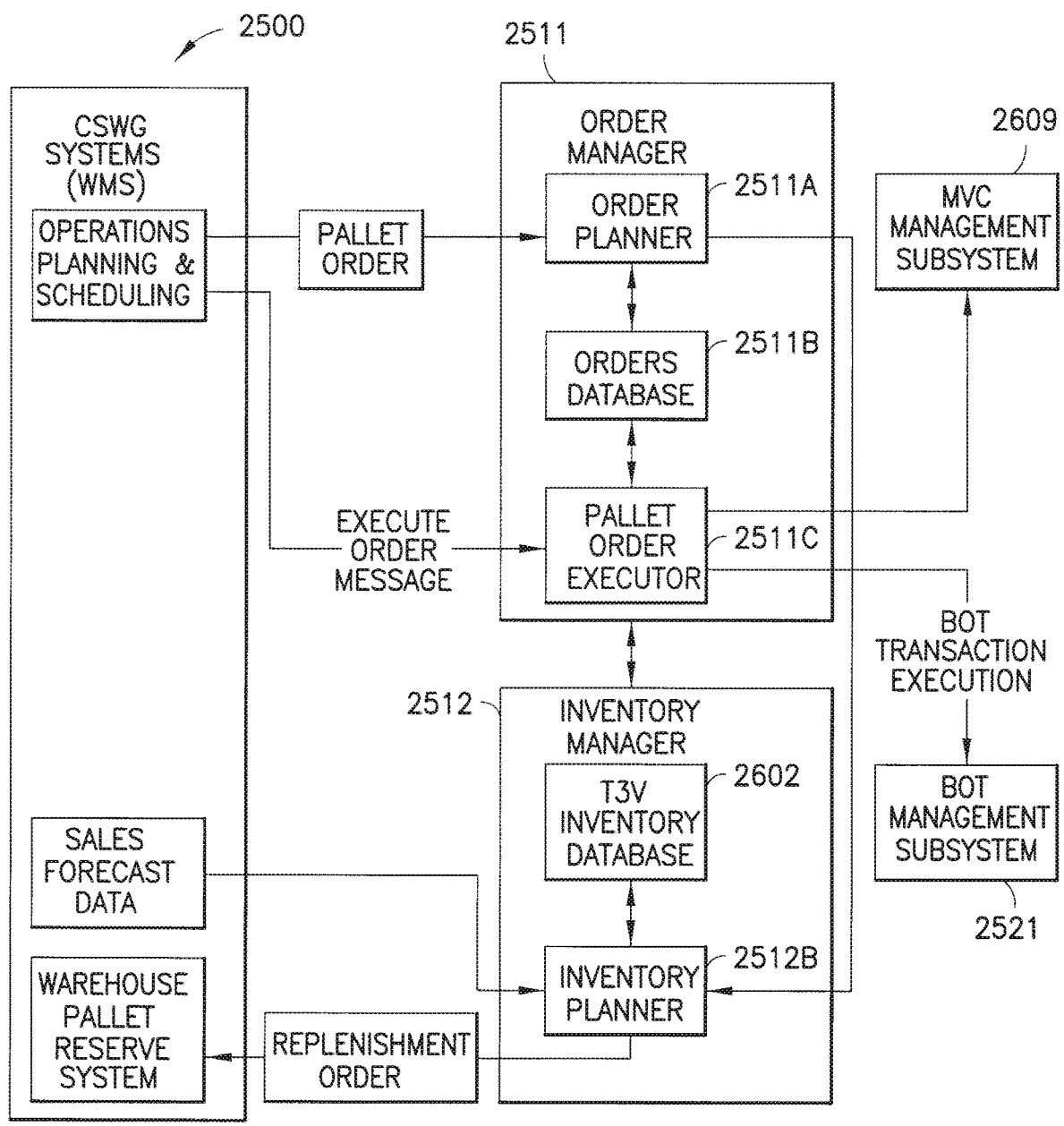
FIG. 5 schematically illustrates a portion of the control system of FIG. 2 in accordance with an exemplary embodiment.

The order fulfillment and replenishment processes will now be described in greater detail. When an order is to be fulfilled the warehouse management system 2500 issues an execute order message (FIG. 5) to, for example, the order manager 2511. The execute order message refers to a pallet identification specified at the time of order entry and it specifies an out-feed station 2860A, 2860B and/or palletizing station 2820A, 2820B. As can be seen in FIGS. 3 and 4, the order manager 2511 may be configured to receive the orders from the warehouse management system 2500. The order manager 2511 may issue tasks to individual level managers 2608 to pick up and/or put away items. It is noted that communication between, for example, the order manager 2511 and the level managers 2608 may be over any suitable communication channel/protocol including, but not limited to, a three-phase commit protocol configured to substantially ensure that the communications are not duplicated in the event of, for example, a system outage or interruption. The level managers 2608 may be configured to control a respective level of the storage structure 130. In one exemplary embodiment, there may be one level manager 2608 per storage structure level. In alternate embodiments, there may be more than one level associated with each level manager 2608. In still other alternate embodiments, there may be more than one level manager 2608 associated with each level in the storage structure 130. Each level manager 2608 may be configured to receive tasks to be completed by the respective level and issue tasks for the respective bots 110A, 110B, 110N to execute. In this example, bots 110A correspond to bots of, for example, level 1 of the storage structure 130, bots 110B correspond to bots of, for example, level 2 of the storage structure and bots 110N correspond to, for example bots of level "n" of the storage structure, where the storage structure has any suitable number of levels.

Figure 4A:
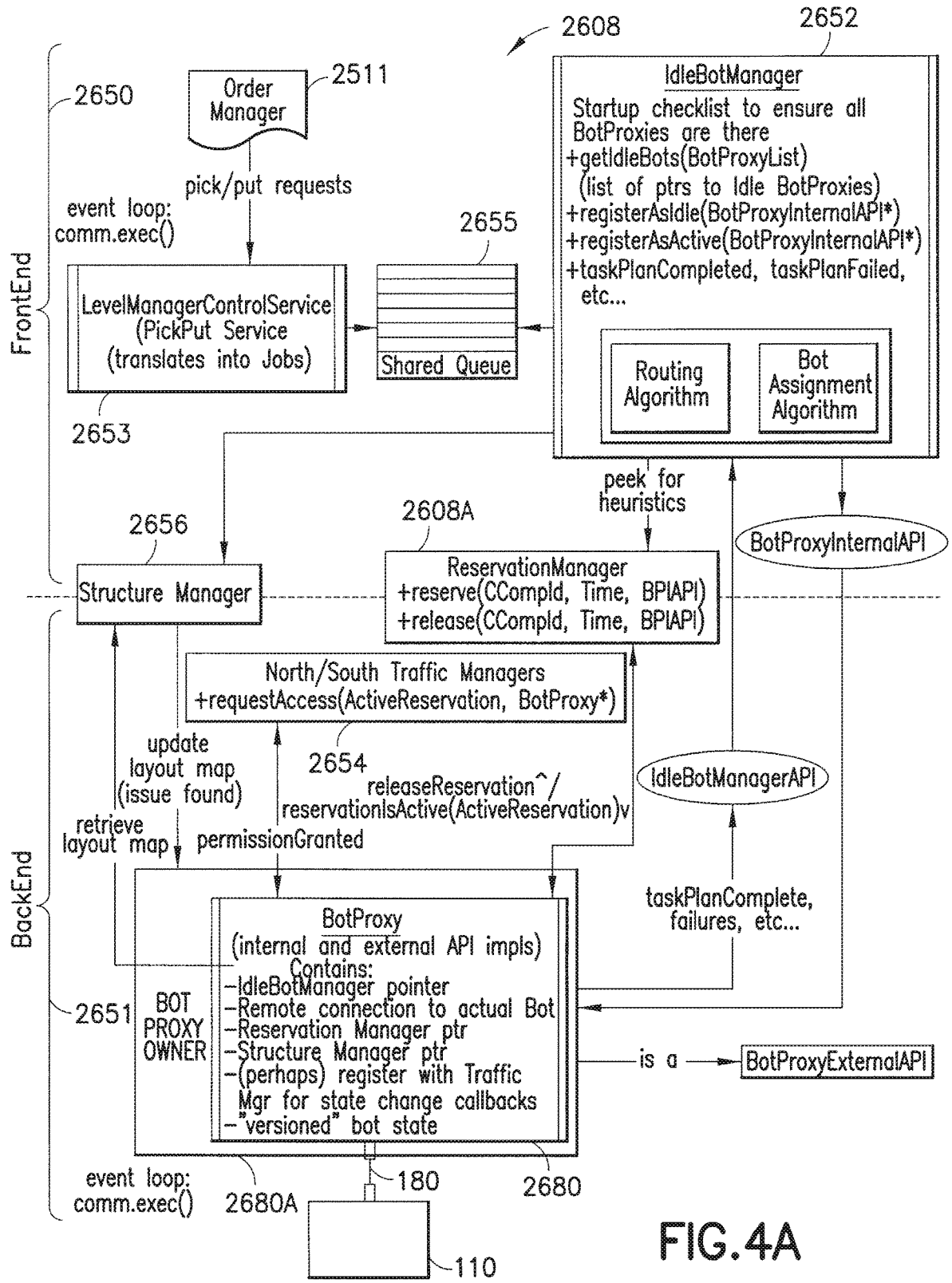
FIG. 4A schematically illustrates a portion of the control system of FIG. 2 in accordance with an exemplary embodiment.

Referring also to FIG. 4A, each level manager 2608 may be split into, for example, two services such as a front end service 2650 and a backend or bot service 2651. The front end service 2650 may include, for example, a control service 2653 and an idle bot manager 2652. The back end 2651 may include traffic managers 2654 and bot proxy 2680. A structure manager 2656 and a reservation manager 2608A may be shared by the front end service 2650 and the back end service 2651. In alternate embodiments the level managers 2608 may have any suitable configuration for controlling one or more respective levels of the storage and retrieval system 100. In one example, pick and put requests may enter a control service 2653 through the front end 2650. For example, the front end 2650 may receive requests from, for example, the order manager 2511 and/or inventory manager 2512 and dispatch those requests to idle bots 110 in the form of bot jobs or tasks. In alternate embodiments the front end may receive requests from the back end 2651. The front end may be configured to convert the request to a job and assign that job a unique identification. The job may be placed in one or more queues 2655 (e.g. a high priority queue or a low priority queue) that are shared between an idle bot manager 2652 and the control service 2653. Jobs may be classified as high priority when, for exemplary purposes only, the jobs are needed for processing a current order. Jobs may be classified as low priority, for exemplary purposes, when the jobs are needed for processing orders to be fulfilled at a later time (e.g. after the current order). It is noted that the status of jobs may change from low to high priority as other jobs are completed. In alternate embodiments the jobs may have any suitable classification for prioritizing the jobs. If there are no idle bots 110 to perform a job (as determined by e.g. the idle bot manager 2652 as described below) the front end relinquishes control to an event loop which will notify the front end when one or more bots register as idle so that one of the one or more idle bots can be assigned the job.

The idle bot manager 2652 may be configured to maintain a list of, for example, bot proxies representing idle bots 110 (e.g. bots not actively transporting, picking or putting items within the storage and retrieval system 100). The bot proxy list may be actively updated to reflect changes in bot status from, for example, idle to active and vice versa. The idle bot manager 2652 may be configured to determine, in any suitable manner, the best bot 110 for executing a task and inform the associated bot proxy 2680 for executing the task. In one exemplary embodiment and for exemplary purposes only, when determining which bot should be assigned a given job, the idle bot manager 2652 may analyze one or more of whether a bot is already in a desired picking aisle and directionally oriented for picking an item (if the job is a pick), if there is a bot 110 blocking an aisle needed for fulfilling an order so that the bot can be moved to grant access to the aisle, and whether there are any outstanding high priority jobs to be fulfilled before low priority jobs are considered.

When jobs are assigned to a bot, the idle bot manager 2652 may be configured to determine a travel route for fulfilling the job. The idle bot manager 2652 may be in communication with any suitable components of the storage and retrieval system, such as the structure manager 2656, which provide any suitable information such as, for example, information for analyzing load balancing of the transfer decks, bots and multilevel vertical conveyors, disabled areas of the storage structure 130 (e.g. places where maintenance is being performed), a position of the bot relative to a pick or put position for the job, the distance to be traveled by the bot for completing the job or any other suitable characteristics of the storage and retrieval system 100 when determining a route for the bot. It is noted that the structure manager 2656 may also be configured to monitor and track any suitable changes to the storage structure, such as for example, bad or broken storage slats or legs on the storage racks, undetectable index markers, added storage, travel and/or transfer areas and disabled or removed areas and convey the changes in the storage structure 130 to, for example, the idle bot manager 2652 and/or bot proxies 2680 for the determination of the bot travel routes. Suitable examples of storage racks having slats or legs are described in, for example, U.S. patent application Ser. No. 12/757,381, entitled "STORAGE AND RETRIEVAL SYSTEM," and, U.S. patent application Ser. No. 12/757,220, entitled "STORAGE AND RETRIEVAL SYSTEM," previously incorporated herein by reference in their entirety.

When determining the travel route for fulfilling a job the storage and retrieval system 100 may be configured to allow substantially unimpeded access to substantially all areas of the storage and retrieval system in the event of, for example, a stoppage in the system so that the system continues operation with substantially no or minimized loss in throughput. Referring also to FIG. 1, a stoppage in the system may include, but is not limited to, a disabled bot 110 within a picking aisle or on a transfer deck, a disabled multilevel vertical conveyor 150A, 150B and/or a disabled in-feed or out-feed transfer station 160, 170. As may be realized, the storage and retrieval system 200, 300, 400 may be configured to allow substantially redundant access to each of the storage locations within the picking aisles. For example, a loss of an input multilevel vertical conveyor 150A may result in substantially no loss of storage space or throughput as there are multiple input multilevel vertical conveyors 150A that can transport case units to each level/ storage space within the storage structure 130. As another example, the loss of a bot out of a picking aisle may result in substantially no loss of storage space or throughput as there are multiple bots 110 on each level capable of transferring case units between any one of the storage spaces and any one of the multilevel vertical conveyors 150A, 150B. In still another example, the loss of a bot 110 within a picking aisle may result in substantially no loss of storage space or throughput as only a portion of a picking aisle is blocked and the storage and retrieval system may be configured to provide multiple paths of travel to each of the storage spaces or types of case units within the storage spaces. In yet another example, a loss of an output multilevel vertical conveyor 150B may result in substantially no loss of storage space or throughput as there are multiple output multilevel vertical conveyors 150B that can transport case units from each level/storage space within the storage structure 130. In the exemplary embodiments, transport of the case units (e.g. via the multilevel vertical conveyors and bots) is substantially independent of storage capacity and case unit distribution and vice versa (e.g. the storage capacity and case unit distribution is substantially independent of transport of the case units) such that there is substantially no single point of failure in either storage capacity or throughput of case units through the storage and retrieval system.

As described above, the control server 120, through, for exemplary purposes only, the idle bot manager 2652 may be configured to communicate with the bots 110, multilevel vertical conveyors 150A, 150B, in-feed or out-feed transfer stations 160, 170 and other suitable features/components of the storage and retrieval system in any suitable manner. The bots 110, multilevel vertical conveyors 150A, 150B and transfer stations 160, 170 may each have respective controllers that communicate with the control server 120 for conveying and/or receiving, for example, a respective operational status, location (in the case of the bots 110) or any other suitable information. The control server may record the information sent by the bots 110, multilevel vertical conveyors 150A, 150B and transfer stations 160, 170 for use in, for example, planning order fulfillment or replenishment tasks.

As may be realized, any suitable controller of the storage and retrieval system such as for example, the idle bot manager 2652 of the control server 120, may be configured to create any suitable number of alternative pathways for retrieving one or more items from their respective storage locations when a pathway provided access to those items is restricted or otherwise blocked. For example, the control server 120 may include suitable programming, memory and other structure for analyzing the information sent by the mots 110, multilevel vertical conveyors 150A, 150B and transfer stations 160, 170 for planning a bot's 110 primary or preferred route to a predetermined item within the storage structure. The preferred route may be the fastest and/or most direct route that the bot 110 can take to retrieve the item. In alternate embodiments the preferred route may be any suitable route. The control server 120 may also be configured to analyze the information sent by the bots 110, multilevel vertical conveyor 150A, 150B and transfer stations 160, 170 for determining if there are any obstructions along the preferred route. If there are obstructions along the preferred route the control server 120 may determine one or more secondary or alternate routes for retrieving the item so that the obstruction is avoided and the item can be retrieved without any substantial delay in, for example, fulfilling an order. It should be realized that the bot route planning may also occur on the bot 110 itself by, for example, any suitable control system, such as control system onboard the bot 110. As an example, the bot control system may be configured to communicate with the control server 120 for accessing the information from other bots 110, the multilevel vertical conveyors 150A, 150B and the transfer stations 160, 170 for determining the preferred and/or alternate routes for accessing an item in a manner substantially similar to that described above. It is noted that the bot control system may include any suitable programming, memory and/or other structure to effect the determination of the preferred and/or alternate routes.

Figure 12:
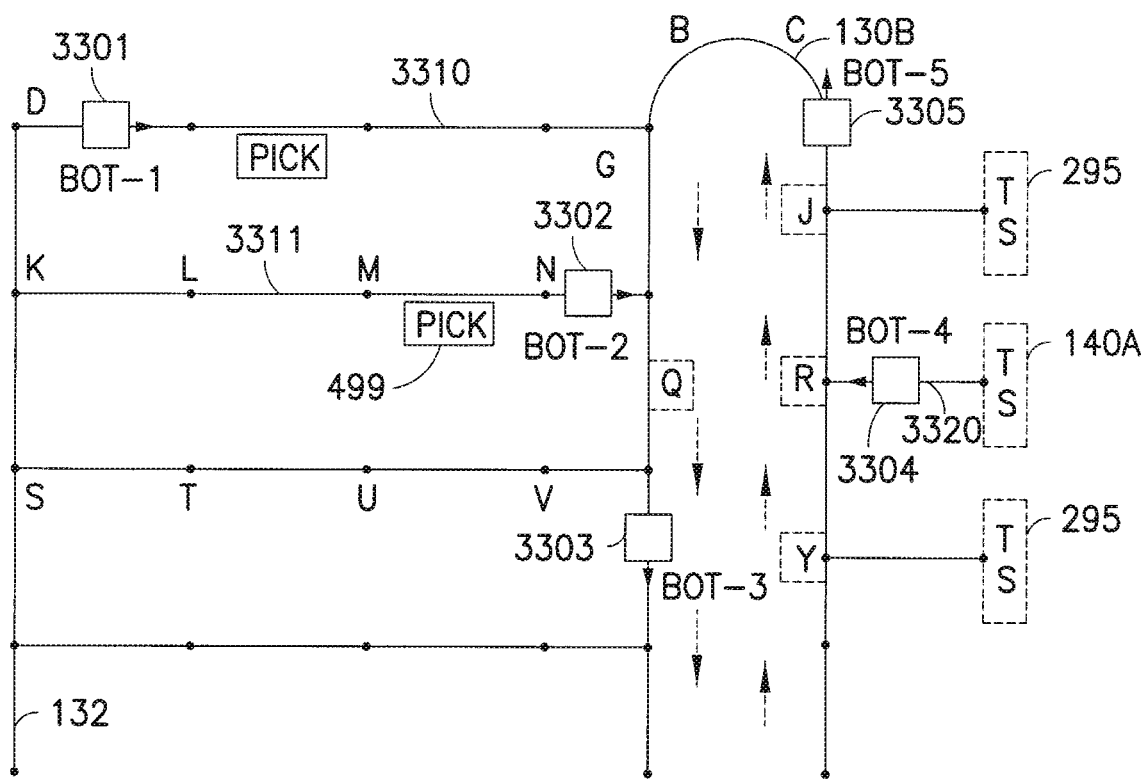
FIG. 12 is a schematic illustration of bot traffic management in accordance with an exemplary embodiment.

Referring also to FIG. 12, as a non-limiting example, in an order fulfillment process the bot 3303, which is traversing transfer deck 130B, may be instructed to retrieve an item 499 from picking aisle 3311. However, there may be a disabled bot 3302 blocking aisle 3311 such that the bot 3303 cannot take a preferred (e.g. the most direct and/or fastest) path to the item 499. In this example, the control server may instruct the bot 3303 to traverse an alternate route such as through any unreserved picking aisle (e.g. an aisle without a bot in it or an aisle that is otherwise unobstructed) so that the bot 3303 can travel along, for example, a second transfer deck or a bypass aisle 132. The bot 3303 can enter the end of the picking aisle 3311 opposite the blockage from, for example, bypass aisle 132 so as to avoid the disabled bot 3302 for accessing the item 499. As can be seen in FIG. 12, one or more bypass aisles 132 may run substantially transverse to the picking aisles to allow the bots to move between picking aisles in lieu of traversing the transfer decks 130B. The bypass aisles 132 may be substantially similar to travel lanes of the transfer decks 130B (as described in, for example, U.S. patent application Ser. No. 12/757,220, entitled "STORAGE AND RETRIEVAL SYSTEM," previously incorporated by reference) and may allow bidirectional or unidirectional travel of the bots through the bypass aisle. The bypass aisle 132 may provide one or more lanes of bot travel where each lane has a floor and suitable guides for guiding the bot along the bypass aisle. In alternate embodiments, the bypass aisles may have any suitable configuration for allowing the bots 110 to traverse between the picking aisles 130A. As may also be realized, if one of the in-feed or out-feed transfer stations 160, 170 or multilevel vertical conveyors 150A, 150B become disabled order fulfillment or replenishment tasks may be directed by, for example, control server 120, to other ones of the in-feed and out-feed transfer stations 160, 170 and/or multilevel vertical conveyors 150A, 150B without substantial disruption of the storage and retrieval system.

The bot proxy 2680 (FIG. 4A) receives the jobs for a respective bot 110 from, for example, the idle bot manager 2652 and takes control of the task until, for example, a completion of the task or an unrecoverable bot failure. The bot proxy 2680 may be a "stand in" for a respective bot 110 on the control server 120 and be configured to, for example, manage the detailed execution of tasks by a respective bot and track the task's execution. The bot proxy 2680 may be configured to receive any suitable information from, for example, the idle bot manager 2652. In one example, a bot proxy owner 2680A may be configured to receive a list of bots expected to perform respective tasks and any other suitable information (e.g. storage structure map, pointers to level manager interfaces and objects, etc.) for the operation of the bot proxy owner 2680A. The bot proxy owner 2680A may pass information to one or more bot proxies 2680 for each bot selected to perform a job. The bot proxy 2680 may be configured to provide a status of the bot to any suitable entity (e.g. idle bot manager 2652, operator workstations, etc.) of the storage and retrieval system 100. In one example, if the bot proxy 2680 determines a bot 110 cannot perform a task assigned to the bot 110, the bot proxy 2680 may be configured to notify the control service 2653 and re-register the bot as idle with the idle bot manager 2652. The bot proxy 2680 may communicate with, for example, a traffic manager 2654 and the reservation manager 2608A to gain access to one or more of the transfer deck 130B, multilevel vertical conveyor transfer locations 2840A, 2840B (e.g. locations within the storage and retrieval system where the bots may be located for interfacing directly with the multilevel vertical conveyors, FIG. 7) and picking aisles 130A. For exemplary purposes only, the bot proxy 2680 (or any other suitable portion of the control server 120) may be configured to reserve access to one or more of the picking aisles 130A and transfer deck 130B for timing the route of the bot 110 so that each bot 110 used to fulfill an order arrives at a predetermined multilevel vertical conveyor 150 in a predetermined sequence to effect a predetermined arrangement of items on an outbound pallet. Upon completion of a task, the bot proxy 2680 registers as idle with the idle bot manager 2652 and indicates an identification of the task completed by the bot 110. If the task failed, the bot proxy 2680 registers as idle, indicates an identification of the task and indicates why the task failed.

Figure 4B:
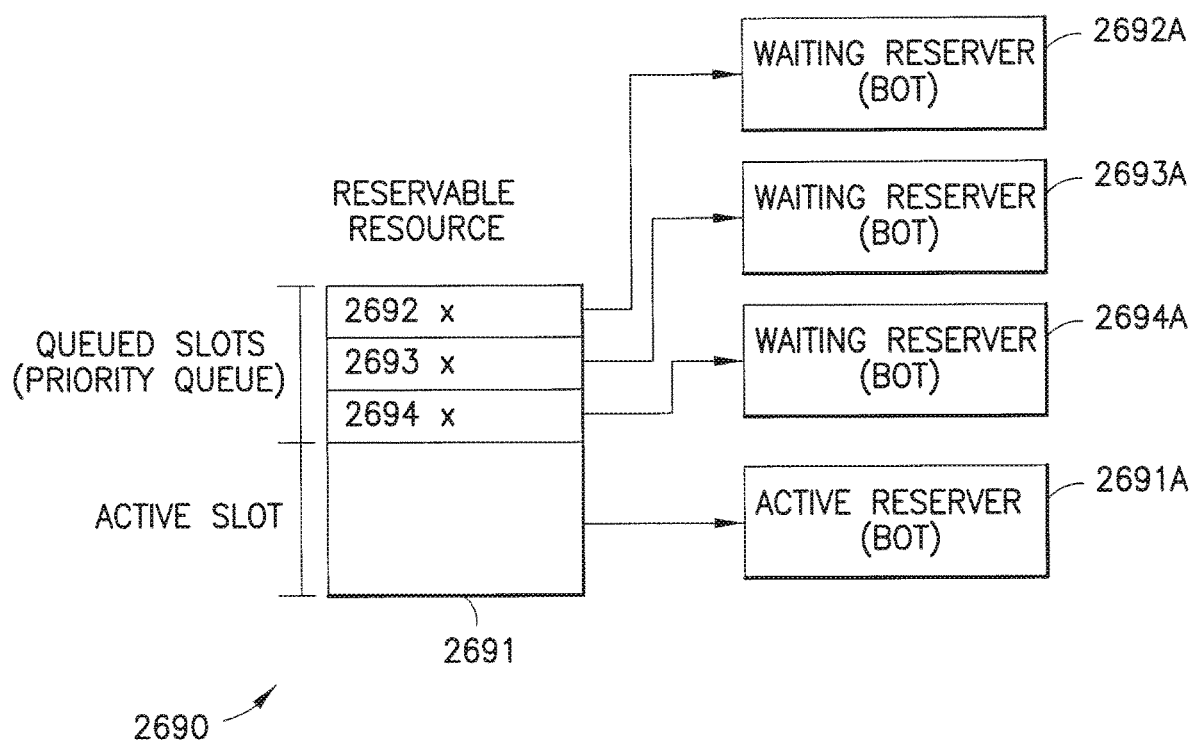
FIG. 4B illustrates a resource reservation queue in accordance with an exemplary embodiment.

Referring again to FIG. 4, the order manager 2511 may be configured to send requests for reservation to one or more multilevel vertical conveyor controllers 2609, which may include multilevel vertical conveyor managers 2609M. Referring also to FIG. 4B it is noted that reservations as described herein may be organized in a queue 2690 having for example, an active slot (e.g. the current job) associated with an active reserver and queued slots 2692-2694 associated with waiting reservers 2692A-2694A, where a reserver is for example, a bot, multilevel vertical conveyor, a transfer station, or any other suitable component of the storage and retrieval system 100. In alternate embodiments the reservations may be handled in any suitable manner. For exemplary purposes only, the order manager 2511 and the multilevel vertical conveyor managers 2609M may communicate with the bot proxy 2680 for effecting the sequencing of items onto the multilevel vertical conveyors 150. In alternate embodiments, any suitable portion of the control server 120 may allow for the sequencing of items onto the multilevel vertical conveyors. There may be one or more multilevel vertical conveyor managers 2609M associated with each multilevel vertical conveyor 150. In alternate embodiments, there may be one or more multilevel vertical conveyors 150 associated with each multilevel vertical conveyor managers 2609M. The multilevel vertical conveyor managers 2609M may be configured to, for example, keep track of the operation of respective multilevel vertical conveyors 150 and respond to requests for reservations of the multilevel vertical conveyors 150 for transporting items to and from each level of the storage structure 130. Each multilevel vertical conveyor manager 2609M may be configured to coordinate with its respective multilevel vertical conveyor(s) 150 in any suitable manner such as by, for example, using synchronized time kept using a network time protocol.

The inventory manager 2512 is configured to receive the replenishment orders from the warehouse management system. The inventory manager 2512 may be configured to access and/or maintain one or more suitable databases of the storage system 2400 for tracking inventory and/or issuing or aiding in the issuance of bot tasks. In one example the inventory manager 2512 may be in communication with one or more of an item master database 2601, an inventory database 2602 and a storage and retrieval system map database 2603 (and any other suitable databases). The item master database 2601 may include a description of the stock keeping units (SKUs) that are handled by or otherwise located in the storage and retrieval system 100. The inventory database 2602 may include, for example, the location of each item inventoried in the storage and retrieval system 100. The storage and retrieval system map database 2603 may include a substantially complete description of the physical structure of the storage and retrieval system 100 including, but not limited to, each storage level, aisles, decks, shelves, transfer stations, conveyors and any other suitable structures within the storage and retrieval system. In alternate embodiments the storage system 2400 may include any suitable databases for providing operational information to, for example, the order manager 2511 and/or the inventory manager 2512. In one exemplary embodiment, the inventory manager 2512 may be configured to provide any suitable inventory information to other suitable components of the storage and retrieval system such as, for exemplary purposes only, the order manager 2511 as described herein to allow the order manager 2511 to reserve items against an order.

Figure 6A:
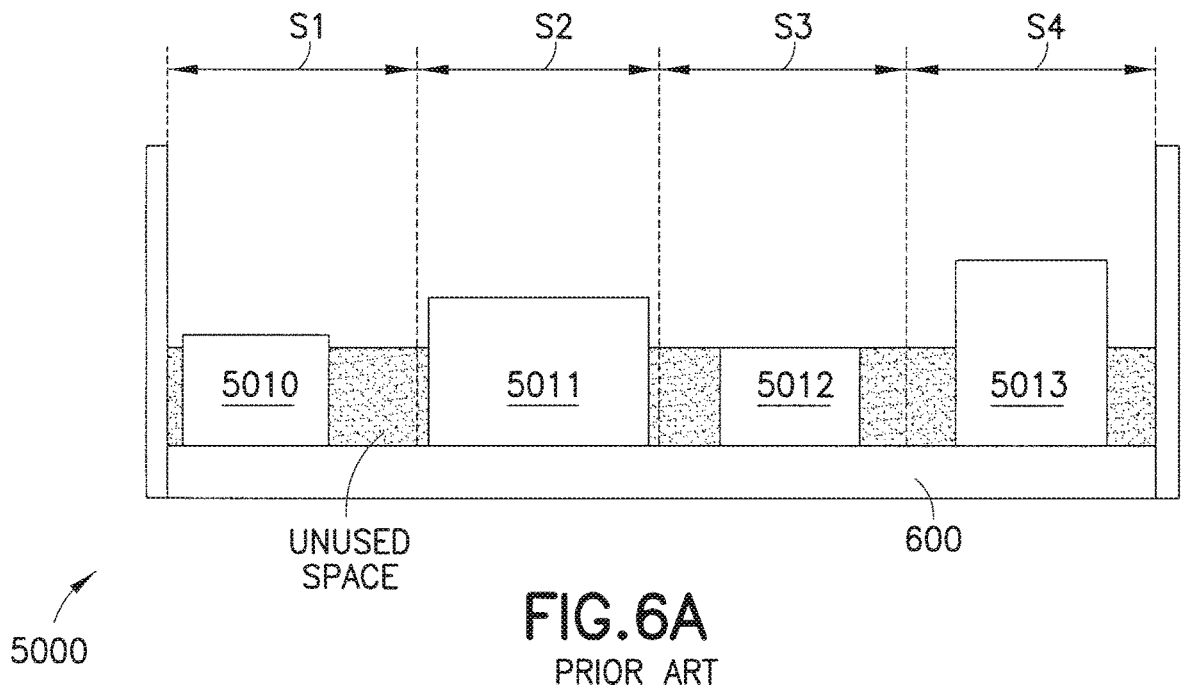
FIG. 6A illustrates a conventional organization of item storage in a storage bay.
Figure 6B:
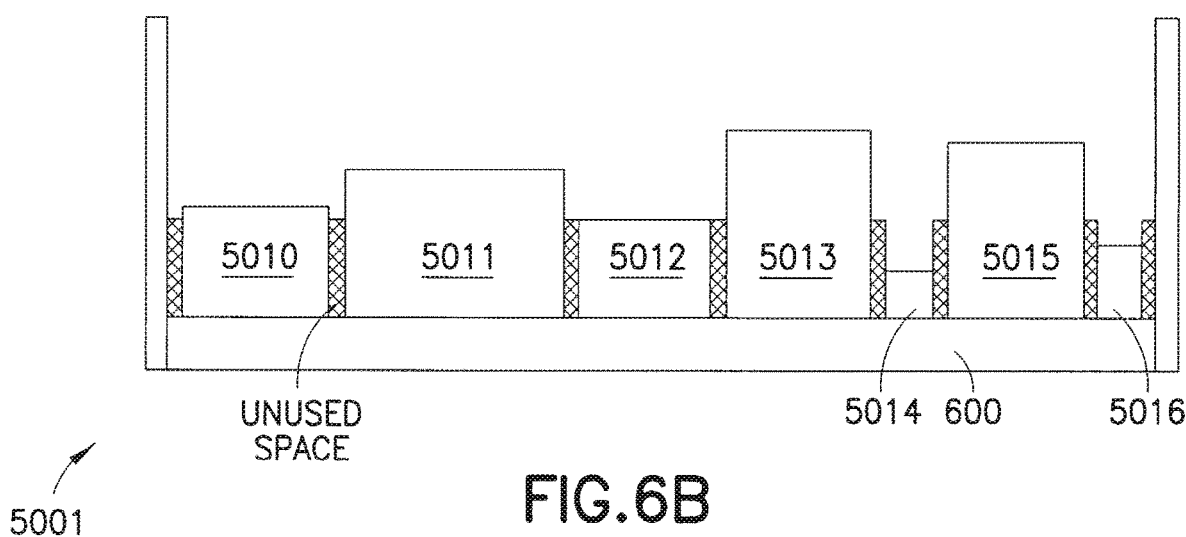
FIG. 6B illustrates an organization of items in a storage bay in accordance with an exemplary embodiment.
Figure 6C:
FIG. 6C illustrates a comparison of unused storage space between the item storage of FIG. 6A and the item storage of FIG. 6B.

The reservation of items substantially prevents more than one bot 110 from attempting to retrieve the same item from storage. The inventory manager 2512 also allows for the assignment and reservation of a pickface for putting away an inbound item such as during replenishment of the storage and retrieval system 100. In one exemplary embodiment, when a storage slot/space becomes available in the storage structure 130, the inventory manager 1512 may assign a fictitious item (e.g. an empty case) to the empty storage slot. If there are adjacent empty slots in the storage structure the empty cases of the adjacent storage slots may be combined to fill the empty space on the storage shelf. As may be realized, the size of the slots may be variable such as when dynamically allocating shelf space. For example, referring to FIGS. 6A-6C, instead of placing case units 5011 and 5012 in predetermined storage areas on the storage shelf 5001, the storage slots may be dynamically allocated such that the cases 5011, 5012 are replaced by three cases having the size of case unit 5010. For example, FIG. 6A illustrates a storage bay 5000 divided into storage slots S1-S4 as is done in conventional storage systems. The size of the storage slots S1-S4 may be a fixed size dependent on a size of the largest item (e.g. item 5011) to be stored on the shelf 600 of the storage bay 5000. As can be seen in FIG. 24A, when items 5010, 5012, 5013 of varying dimensions, which are smaller than item 5011, are placed in a respective storage slot S1, S2, S4 a significant portion of the storage bay capacity, as indicated by the shaded boxes, remains unused. In accordance with an exemplary embodiment, FIG. 6B illustrates a storage bay 5001 having dimensions substantially similar to storage bay 5000. In FIG. 6B the items 5010-5016 are placed on the shelf 600 using dynamic allocation such that the empty storage slots are substantially continuously resized as uncontained case units are placed on the storage shelves (e.g. the storage slots do not have a predetermined size and/or location on the storage shelves). As can be seen in FIG. 6B, dynamically allocating the storage space allows placement of items 5014-5016 on shelf 600 in addition to items 5010-5013 (which are the same items placed in storage bay 5000 described above) such that the unused storage space, as indicated by the hatched boxes, is less than the unused storage space using the fixed slots of FIG. 6A. FIG. 6C illustrates a side by side comparison of the unused storage space for the fixed slots and dynamic allocation storage described above. It is noted that the unused storage space of bay 5001 using dynamic allocation may be decreased even further by decreasing the amount of space between the items 5010-5016 which may allow for placement of additional items on the shelf 600. As may be realized, as items are placed within the storage structure the open storage spaces may be analyzed, by for example the control server 120, after each item placement and dynamically re-allocated according to a changed size of the open storage space so that additional items having a size corresponding to (or less than) a size of the re-allocated storage space may be placed in the re-allocated storage space. In alternate embodiments, the storage slots may also be allocated so that items that are frequently picked together are located next to each other. When a predetermined pickface is reserved for an item that is being delivered, at least a portion of the empty case sitting in the location where the item is to be placed is replaced by a fictitious item having the features (e.g. size, etc.) of the item being delivered to prevent other inbound items from being assigned to the predetermined pickface. If the item is smaller than the empty case that it is replacing the empty case may be resized or replaced with a smaller empty case to fill the unused portion of the storage shelf. Another item may then be placed within the storage slot corresponding to the resized smaller empty case and so on.

In this example, the control server 120 includes an executive module 2606, which may be configured to provide an interface between, for example, the control server 120 and an operator. The executive module 2606 may allow monitoring and/or control of the storage and retrieval system operations in any suitable manner such as, for example, through one or more user interface terminals 2410. The executive module 2606 may be configured to provide any suitable reports and allow operator access to an aisle maintenance manager 2607. The aisle maintenance manager 2607 may be configured to allow personnel access into any suitable portion of the storage and retrieval system such that interaction between the personnel and moving components of the storage and retrieval system is substantially eliminated. For example, when it is determined by the executive module 2606 that personnel are accessing a predetermined portion of the storage and retrieval system 100 the executive module 2606 may automatically effect a "lock out" or disabling of all mechanized elements (e.g. bots, conveyors, etc.) within the predetermined portion of the storage and retrieval system being accessed by the personnel. In alternate embodiments, the operator may manually effect the lock out of the predetermined area being accessed by the personnel.

Referring again to FIGS. 2, 3 and 5 an exemplary pallet order entry and replenishment process will be described. A portion of, for example, a predetermined time period's (e.g. hour, day, week, or other suitable time period) pallet orders are submitted to the order manager 2511. The order manager records the orders into, for example, an order database 2511B and forwards the information to an inventory planner module 2512B (which may be a subsystem of the inventory manager 2512). It is noted that the inventory planner 2512B may be configured to generate a schedule of replenishment orders based on the pallet orders that will maintain a sufficient quantity and composition of picking stock to, for example, substantially prevent an unavailability of items throughout the order fulfillment process for the predetermined time period and to prepare the storage and retrieval system for, for example, the start of the next predetermined order fulfillment time period. In one exemplary embodiment, the inventory planner 2512B may be configured to sort the orders by time and using, for example, a current inventory as a beginning balance, the inventory planner 2512B may compute an inventory level that would result at the end of each predetermined order fulfillment time period. Based on, for example, per-SKU preorder thresholds, per-SKU economic order quantity, target end of predetermined time period balances, and an inventory calculated after each order, the inventory planner 2512B computes a schedule of planned replenishment orders and submits the replenishment orders to the warehouse management system 2500. As new pallet orders are submitted to the order manager 2511, the above computations are repeated, which may result in a modification of the replenishment orders. In alternate embodiments the inventory storage and retrieval system 100 may be maintained in any suitable manner.

Figure 7:
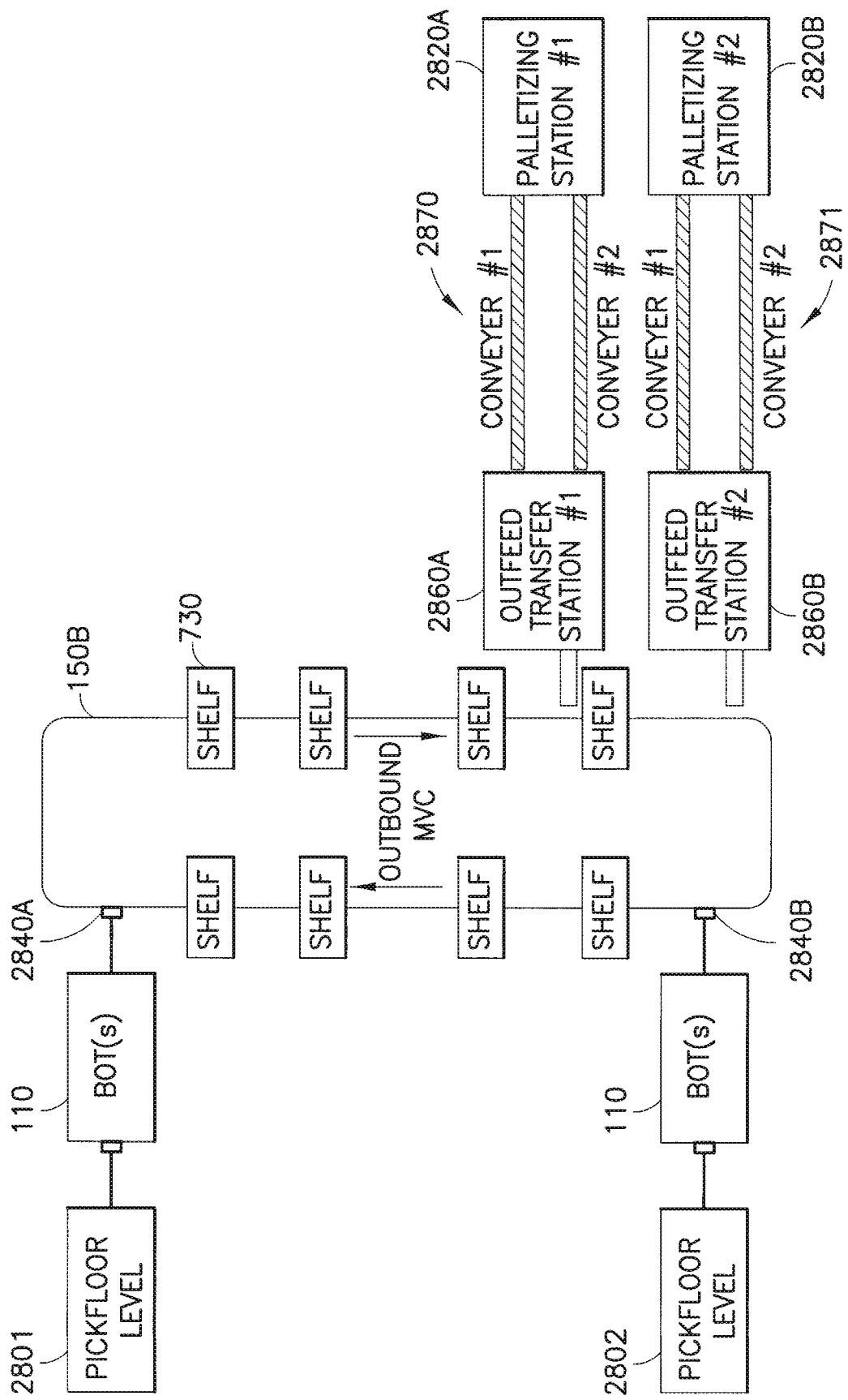
FIG. 7 is a schematic illustration of a portion of a storage and retrieval system in accordance with an exemplary embodiment.

Referring also to FIG. 7, as each order is fulfilled, bots 110 for their respective storage levels 2801, 2802 deliver the picked items to, for example, outbound multilevel vertical conveyor 150B in a predetermined sequence as described above. In alternate embodiments the bots 110 may deliver the picked items to output transfer stations for indirectly interfacing with the multilevel vertical conveyors. The bots 110 transfer the items to the multilevel vertical conveyor for transport to one or more out-feed transfer stations 2860A, 2860B. The out-feed transfer stations 2860A, 2860B may be substantially similar to out-feed transfer stations 160 described above with respect to, for example FIG. 1. The items are transported from out-feed transfer stations 2860A, 2860B to a respective one of the palletizing stations 2820A, 2820B by one or more suitable conveyors. In this example, there are two accumulation conveyors feeding each palletizing station 2820A, 2820B. In alternate embodiments there may be more or less than two conveyors feeding each palletizing station 2820A, 2820B. Each set of accumulation conveyors 2870, 2871 may be managed by, for example, the order manager 2511 or any other suitable subsystem of the control server 120 for providing a buffer system to each of the respective palletizing stations 2820A, 2820B. For example, out-feed transfer station 2860A can be filling conveyor 1 of the set of conveyors 2870 while the palletizing station 2820A is emptying conveyor 2 of the set of conveyors 2870 so that the rate of transferring items to the out-feed stations does not have to be matched to the rate at which the palletizing station 2820A places the items on a pallet. In alternate embodiments, any suitable buffer system may be provided for supplying items to the palletizing stations 2820A, 2820B. In still other alternate embodiments, the rates of supplying items to the out-feed stations 2860A, 2860B may be matched to the rates at which items are palletized by the palletizing stations 2820A, 2820B.

In one exemplary embodiment, the above-described exemplary order fulfillment process may be processed by the order manager 2511 in, for example, any suitable number of phases. For exemplary purposes only, in this exemplary embodiment the order manager 2511 may process the pallet order in a transaction planning phase and a transaction execution phase. In the transaction planning phase the order manager 2511 may reserve the multilevel vertical conveyor and pickface resources for delivering a predetermined number of items of each ordered SKU to the palletizing station in a predetermined sequence. The order manager 2511 may generate a series of pick transactions that will fulfill the pallet order. The transaction planning phase may be performed for an entire pallet order, as a batch, before the first pick transaction is released for execution. In alternate embodiments the pick transactions may be generated and executed in any suitable manner.

The pick transactions may be generated by the order manager 2511 in any suitable manner. In one exemplary embodiment, the pick transactions may be generated by choosing a multilevel vertical conveyor, choosing multilevel vertical conveyor transfer locations 2840A, 2840B (FIG. 7) (e.g. a location where the bot(s) interface with a respective multilevel vertical conveyor)/storage level and choosing a pickface. In one exemplary embodiment, the next unreserved shelf 730 on an outbound multilevel vertical conveyor 150B that feeds a designated palletizing station 2820A, 2820B is reserved for picked items. In alternate embodiments, any suitable shelf 730 of any suitable outbound multilevel vertical conveyor may be reserved in any suitable manner.

The multilevel vertical conveyor transfer locations/storage level is chosen such that multilevel vertical conveyor transfer locations 2840A, 2840B is located on a level including a pickface for the SKU. To be selected, the multilevel vertical conveyor transfer locations 2840A, 2840B must not be scheduled as busy (e.g. have another bot located in that station) at the time the target multilevel vertical conveyor platform or shelf 730 arrives, and the target shelf 730 must not be scheduled to arrive at the output transfer station for at least X seconds, where X is the time in seconds that is estimated as required for a bot 110 to pick the ordered item(s) and travel to the multilevel vertical conveyor transfer locations 2840A, 2840B. In alternate embodiments, where there is no output transfer station that satisfies the above criteria on a storage level including the pickface for the SKU, the target multilevel vertical conveyor shelf 730 is left empty and the next platform is reserved in its place. The multilevel vertical conveyor transfer location 2840A, 2840B selection process may be repeated until at least one candidate output transfer station meets the criteria.

The order manager 2511 may request from, for example, the inventory database 2602 a list of all available pickfaces for the specified SKU along with, for example, their attributes such as number of cases, locations, induction and expiration dates. In alternate embodiments the order manager 2511 may request any suitable information regarding the items being picked. The order manager 2511 may request from the associated multilevel vertical conveyor manager 2609M the availability of multilevel vertical conveyor transfer locations 2840A, 2840B that provide access for the bot(s) 110 to interface directly with the multilevel vertical conveyor(s) 150B for feeding the designated palletizing station 2820A, 2820B. The order manager 2511 may determine which multilevel vertical conveyor transfer locations 2840A, 2840B are eligible for the pick transaction according to the above-noted criteria, and select the highest ranked candidate from the eligible multilevel vertical conveyor transfer locations 2840A, 2840B based on, for example, one or more of the following factors:

(a) Scarcity of levels on which the SKU for the items to be picked are located. For example, if the SKU for a particular order line exists on more than P (plentiful) number of levels, then order manager 2511 looks ahead N order lines. If an order line within these N order lines is for a SKU that exists on fewer than S (scarce) number of levels, then the output transfer station/level receives a negative ranking for this factor, reducing the likelihood that it will be used for the current order line and thereby potentially block use of this level for a scarce SKU. It is noted that P is a value that indicates that a SKU exists on a "plentiful" number of levels, S is a value that indicates that a SKU exists on a "scarce" number of levels and N is a value that specifies the number of multilevel vertical platforms that will be inaccessible by the output transfer station after it makes a transfer.

(b) Bot utilization for a given storage level 2801, 2802. For example, the lower the bot utilization is on a given level, the higher the ranking for the transfer station/level. This ranking factor may provide load-balancing for evenly distributing the load of picking tasks throughout the storage structure 130.

(c) Opportunity for pick-down. For example, if there is an opportunity to pick-down a pickface, where picking from that pickface causes the pickface to become empty, it is given a higher ranking.

(d) Pickface abundance. For example, the greater the number of pickfaces on a given level, the higher the ranking that the level will receive.

(e) Maximum delivery window. For example, the delivery window for any given multilevel vertical conveyor transfer locations 2840A, 2840B may be the difference between the arrival time of the target multilevel vertical conveyor shelf 730 at the multilevel vertical conveyor transfer locations 2840A, 2840B and the time of departure of the last bot 110 to drop off at the multilevel vertical conveyor transfer locations 2840A, 2840B. The larger this time window the less likely it is that a delay in bot 110 travel will result in a delivery that misses the window.

(f) Expiration dates. For example, if the SKU requires attention to expiration dates, levels with pickfaces having earlier expiration dates will be given higher scores than those with later expiration dates. In one exemplary embodiment, the weighting of this factor may be inversely proportional to the number of days remaining before expiration, so that it can override certain other criteria if necessary to avoid shipping merchandise too close to its expiration.

(g) Minimum picks for an order line. For example, if an order line cannot be filled by a single pick, it must be broken into multiple picks requiring more than one multilevel vertical conveyor shelf 730 and multiple bots 110. Output transfer stations on levels containing a single pickface that would completely fill the order line are given priority over levels that would require splitting an order line into multiple picks.

This ranking algorithm produces a value for each factor (the higher the value the more desirable the candidate transfer station for the transaction), and the values for all the factors are then weighted and summed to form a total score for each output transfer station/level. The order manager 2511 selects the output transfer station/level with the highest total score and places a reservation with the multilevel vertical conveyor manager 2609M for that output station for the transaction. It is noted that in alternate embodiments the order manager 2511 may determine which multilevel vertical conveyor transfer locations 2840A, 2840B are eligible for the pick transaction in any suitable manner.

In one exemplary embodiment, choosing the pickface may include a ranking system that may prioritize the pickfaces based on predetermined factors. In alternate embodiments, the pickface may be chosen in any suitable manner. For exemplary purposes only, the factors used in choosing the pickface may include:

(a) Pickfaces on the selected level that would pick-down without depleting all the pickfaces for this SKU on the level are scored higher.
(b) Pickfaces that minimize the number of picks for the Order Line are rated higher.
(c) Pickfaces with earlier expiration dates, if applicable, or earlier induction dates otherwise, will be given higher priority over those with later expiration or induction dates.
(d) Pickfaces located in aisles where no potentially conflicting picks are planned will be given higher priority over pickfaces in aisles where such conflicts might cause bot delays. It is noted that in one exemplary embodiment, once a pickface is selected for a pick transaction, the estimated pick-time is recorded for use in this ranking parameter.

Once the pickface has been selected, a reservation for these items is placed with the inventory manager.

The above procedure for transaction planning may generate at least one pick transaction for each order line specifying one or more of the number of cases to be picked, the pickface from which they are to be picked, an output transfer station to which they are to be delivered, the MVC platform on which they are to be placed, and the delivery time-window within which a bot can safely deliver the cases. The at least one pick transaction may be stored in any suitable location, such as in a transaction record in, for example, the storage system 2400.

It is noted that some order lines within the pallet order may not be able to be fulfilled by a single pick transaction, either because the ordered quantity of items is greater than the maximum number of items per pickface for that SKU, or because it is necessary or advantageous for some other reason to pick from two or more partially-full pickfaces. In this event, successive pick transactions are created using the above noted transaction planning procedure until either the order line is satisfied or an out-of-stock condition occurs.

The execution of each transaction, as determined above, generally includes transferring an item(s) from a pickface to a multilevel vertical conveyor transfer locations 2840A, 2840B with a bot 110, transferring the item(s) from the bot 110 located at the multilevel vertical conveyor transfer locations 2840A, 2840B to one or more out-feed transfer stations 2860A, 2860B with the multilevel vertical conveyor and from the out-feed transfer stations 2860A, 2860B to respective palletizing stations 2820A, 2820B with the accumulation conveyors 2870, 2871 where all or part of the item is transferred to an outbound container. It is noted that when bots 110 are at multilevel vertical conveyor transfer locations 2840A, 2840B, the item(s) the bot(s) 110 wait for the predetermined multilevel vertical conveyor shelf 730 to arrive for transferring the item(s) onto the shelf 730. As noted above, management of these bot activities may be performed by one or more level managers 2806. In alternate embodiments, the bots may be managed in any suitable manner by any suitable component of the storage and retrieval system 100.

In one exemplary embodiment, there may be a separate level manager 2806 for each level within the structure. Each level manager 2806 may be configured to manage all bot activities on a respective level for the performance of pick and put-away tasks. In one exemplary embodiment, the level manager may be configured to control the bots and communicate with, for example, the order manager 2511, multilevel vertical conveyor managers 2609M and/or bot proxy 2680 to effect the sequenced delivery of items to the multilevel vertical conveyors. In alternate embodiments the level manager 2806 may be configured to effect the sequenced delivery of items to the multilevel vertical conveyors in any suitable manner. The order manager 2511 may distribute each pick transaction for the pallet order to the appropriate level manager 2608 for the level designated in, for example, the transaction record and awaits notice from the level manager 2608 of completion of transferring the item(s) to the multilevel vertical conveyor transfer locations 2840A, 2840B.

For each pick transaction, the level manager 2608 may provide delivery of the predetermined items (as indicated in the picking order) by the bot(s) 110 to the predetermined multilevel vertical conveyor transfer locations 2840A, 2840B within a predetermined delivery window so that the items are sequenced for pallet building at a corresponding palletizing workstation 2820A, 2820B. The level manager 2608 may assign a bot 110 to perform the task, determine the timing for launching the bot 110 on this task, and instruct a bot proxy 2680 (FIG. 4A) to manage the actual movement of the designated bot. It is noted that the bot proxy 2680 may manage the bot's travel by creating a travel route, reserving resources and clearing the bot onto the transfer deck. The bot proxy 2680 may be resident in, for exemplary purposes only, a level manager 2608 (FIG. 4A) as described above. In alternate embodiments the bot proxy may be located at any other location of the storage and retrieval system 100. When the bot 110 removes the specified number of items from the predetermined pickface(s), the level manager 2608 may send a message to the inventory manager 2512 to update the status of the picked items from "reserved" to "picked". If the picked items are the last remaining items in the predetermined pickface, then their removal either creates a new storage slot or enlarges at least one adjacent slot such that the inventory manager 2512 updates a storage slot database 2910 (FIG. 8) accordingly to, at least in part, facilitate the dynamic allocation of the storage space.

The bot 110 may be configured to notify the level manager 2608 that it has arrived at a multilevel vertical conveyor transfer locations 2840A, 2840B. The level manager 2608 may confirm with, for example, the multilevel vertical conveyor manager 2609M that the multilevel vertical conveyor 150B is on time and that the predetermined shelf 730 is empty. The level manager 2608 may instruct the bot 110 to place its load (e.g. the picked items) onto the predetermined multilevel vertical conveyor shelf 730 (FIG. 7) which has been previously reserved as described above. The transfer of items from the bot 110 to the multilevel vertical conveyor 150B may be a direct transfer or in alternate embodiments it may occur indirectly through an intermediate transfer arm (as described in U.S. patent application Ser. No. 12/757,312 and Ser. No. 12/757,354 previously incorporated by reference). The bot 110 may be configured to inform the level manager 2608 that the items have been transferred to the multilevel vertical conveyor 150B. The level manager 2608 may inform the order manager 2511 that this stage of the pick transaction has been completed. The multilevel vertical conveyor 150B carries the items over to an out-feed transfer station 2860A, 2860B (FIG. 7). In alternate embodiments, the transfer of items to the multilevel vertical conveyor may occur in any suitable manner. In still other alternate embodiments, the order manager 2511 may be informed of the transfer of the item(s) to the multilevel vertical conveyor in any suitable manner. It is noted that in one exemplary embodiment, if the bot 110 fails to arrive at the multilevel vertical conveyor transfer locations 2840A, 2840B on time, or if the multilevel vertical conveyor managers 2609M inform the level manager 2608 that the multilevel vertical conveyor 150B is not on schedule or that the designated shelf 730 is not empty, the level manager 2608 may be configured to inform the order manager 2511 of the same. The order manager 2511 may be configured to revise the delivery plan for the pallet order and send one or more messages to the level manager 2608 informing the level manager 2608 of the revised picking schedule. The level manager 2608 may be configured to revise the task plans depending on the message(s) and inform the bots 110 of the revised picking schedule. In alternate embodiments, the picking schedule may be revised in any suitable manner if there is a delay in transferring items to the multilevel vertical conveyor 150B.

The multilevel vertical conveyor manager 2609M may be configured to send a message to the out-feed transfer station 2860A, 2860B that services the predetermined palletizing station 2820A, 2820B instructing the out-feed transfer station 2860A, 2860B to extract the item(s) from the predetermined multilevel vertical conveyor shelf and place the item(s) onto the respective accumulator conveyor(s) 2870, 2871 feeding the palletizing station 2820A, 2820B. The out-feed transfer station 2860A, 2860B may be configured to send a message to the multilevel vertical conveyor manager 2609M that the item(s) has been removed from the multilevel vertical conveyor 150B indicating completion of the pick transaction. Once all of the pick transactions for a given pallet order have been completed in a manner substantially similar to that described above, order Execution is complete for the pallet order.

Figure 8:
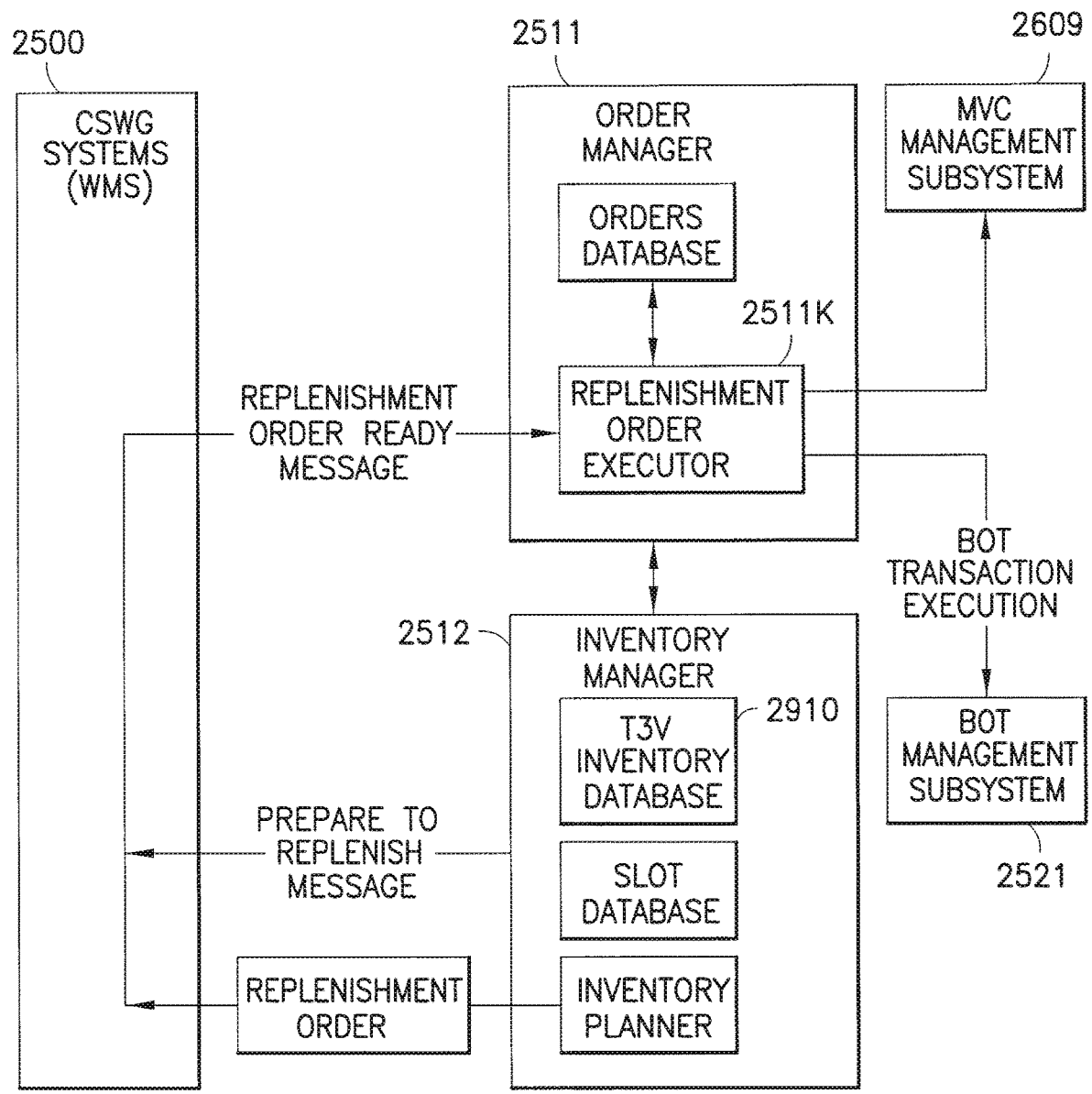
FIG. 8 schematically illustrates a portion of the control system of FIG. 2 in accordance with an exemplary embodiment.
Figure 9:
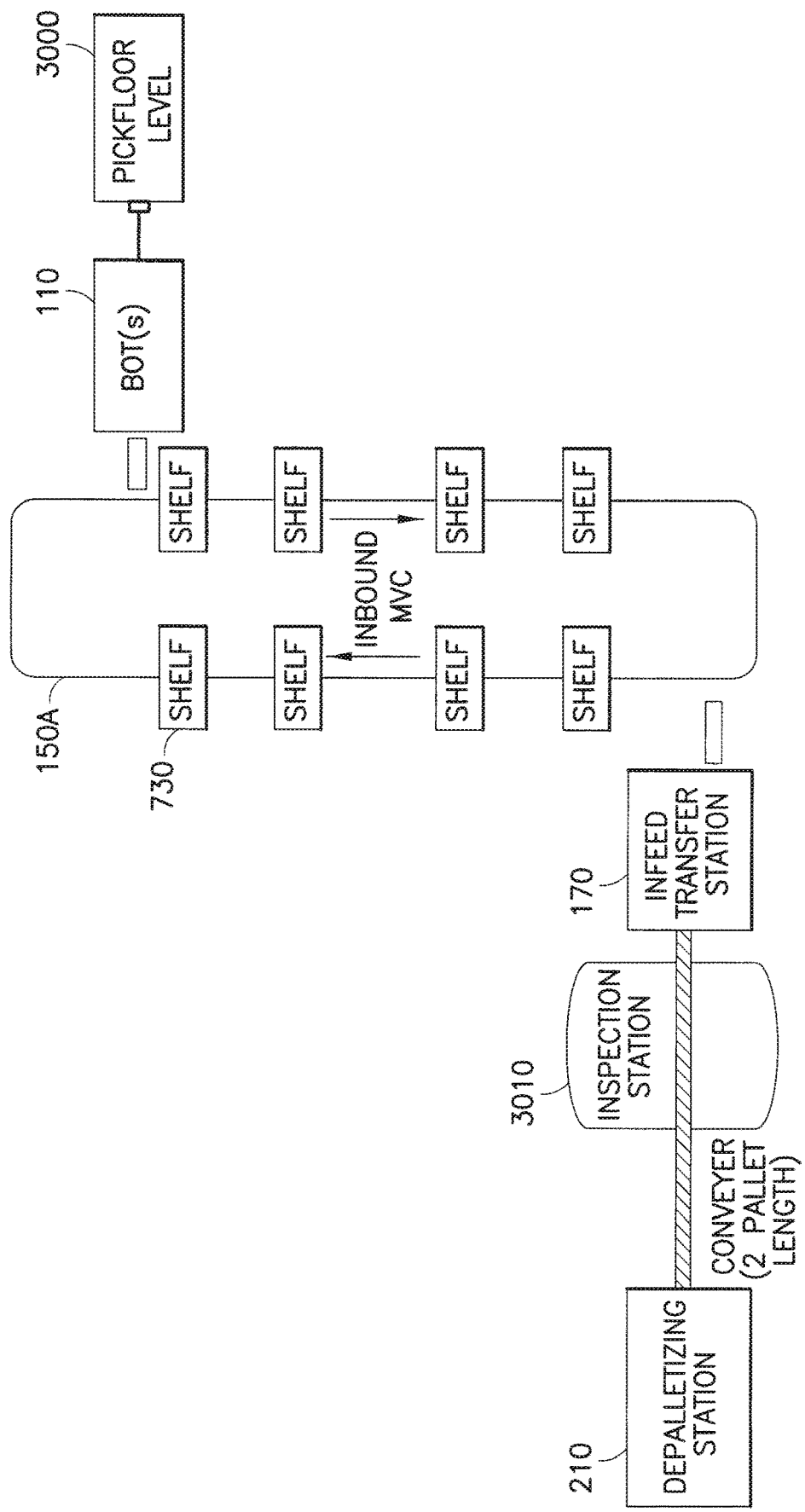
FIG. 9 is a schematic illustration of a portion of a storage and retrieval system in accordance with an exemplary embodiment.
Figure 10:
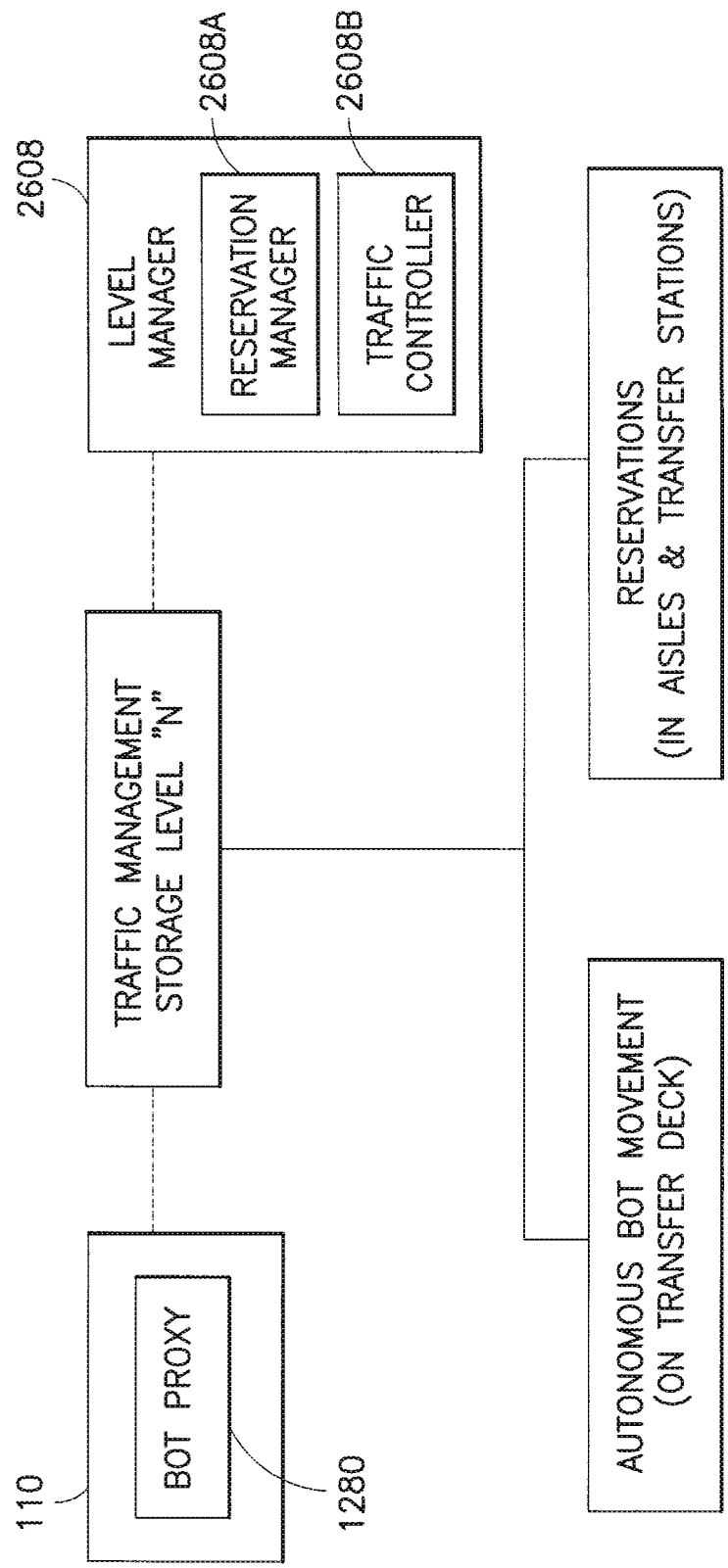
FIG. 10 is a schematic diagram illustrating traffic management in a storage and retrieval system in accordance with an exemplary embodiment.
Figure 11:
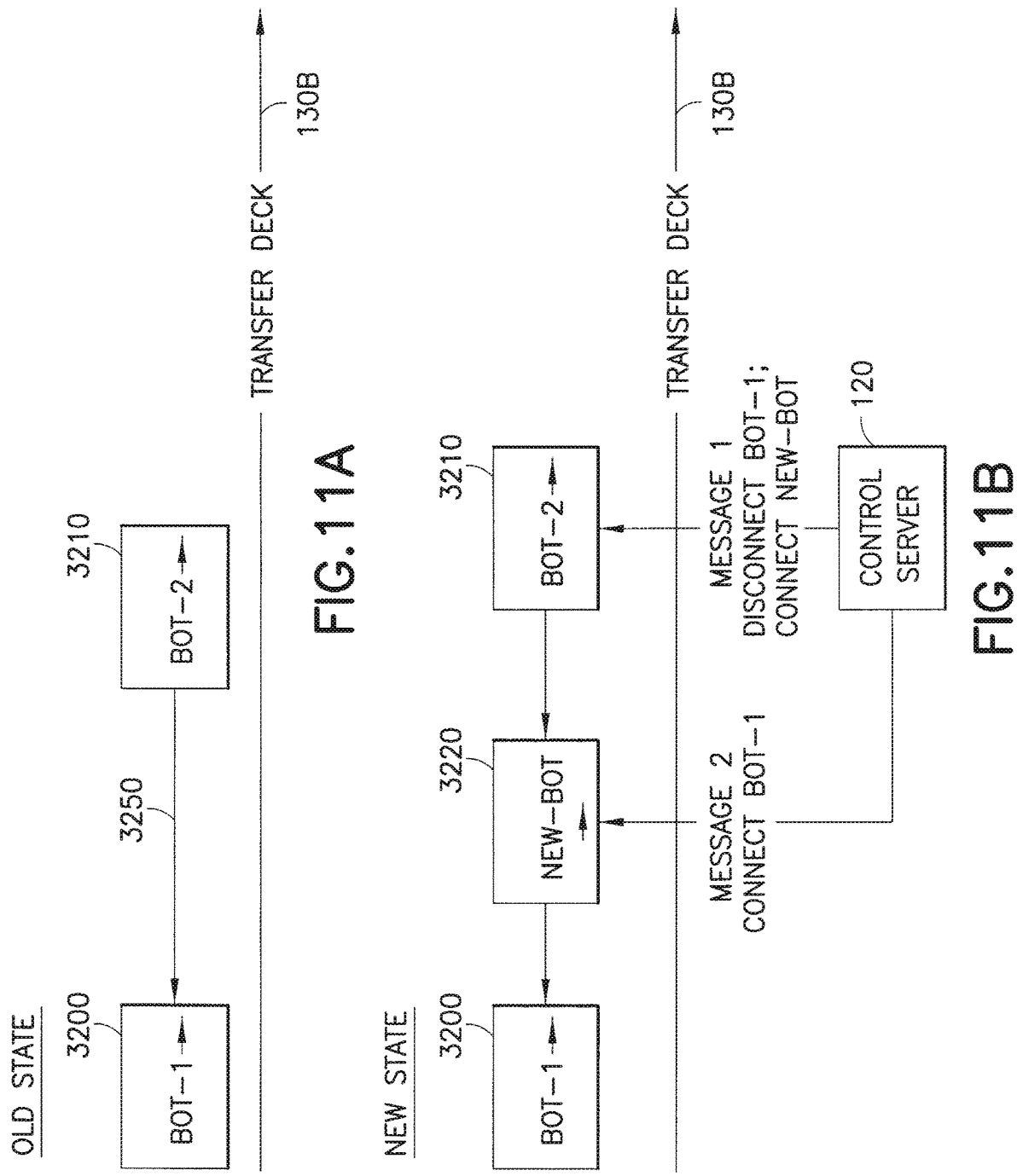
FIGS. 11A and 11B are schematic diagrams illustrating transport robot communications in accordance with an exemplary embodiment.

Referring now to FIGS. 4, 8 and 9 an exemplary inventory replenishment will be described in accordance with an exemplary embodiment. In this example, the inventory manager 2512 may be configured to submit a schedule of requested replenishment orders to the warehouse management system 2500. The replenishment orders may be generated based on the inventory removed from the storage and retrieval system 100 during the above-noted picking process. In accordance with the replenishment orders, the warehouse management system 2500 may be configured to stage the replenishment orders for the storage and retrieval system 100 substantially at predetermined replenish times indicated by the inventory manager 2512. In alternate embodiments, the replenishment orders may be staged in any suitable manner by any suitable warehouse entity. The warehouse management system 2500 may be configured to send a replenishment order ready message to, for example, the order manager 2511 close to or substantially at the predetermined replenish times. In alternate embodiments, the order manager 2511 may be alerted to start a replenishment order in any suitable manner. In one exemplary embodiment, the replenishment order ready message may be received by a replenishment order executor 2511K of the order manager 2511. In another exemplary embodiment, the replenishment order ready message may be received by the inventory manager 2512 through, for example, communications with the order manager 2511. In alternate embodiments the inventory manager 2512 may receive the replenishment order ready message directly from the warehouse management system 2500. In one exemplary embodiment, the replenishment order ready message may indicate that a pallet of items has been staged at, for example, depalletizing station 200 and that the depalletizer is ready for transferring the items into the storage and retrieval system. The replenishment order ready message may also include any suitable information pertaining to the items being staged for replenishment into the storage and retrieval system 100. For exemplary purposes only, in one exemplary embodiment the replenishment order ready message may include the SKU, quantity of items to be depalletized and a depalletizing station identification. The inventory manager 2512 may be configured to validate the information supplied in the replenishment order ready message and may verify that the in-feed transfer station 170 corresponding to the identified depalletizing station is available. The inventory manager 2512 may be configured to send a message to the warehouse management system 2500 if, upon validation, it is determined that the SKU being replenished is different than the SKU specified in the replenishment order, that there are too many or too few items being replenished, that the replenishment is being staged earlier or beyond an expected replenishment time specified in the replenishment order, that there is no space available in the storage structure 130, or that there are no resources available (e.g. the in-feed transfer station 210 and/or the multilevel vertical conveyor 150A is not available). In alternate embodiments, a message may be sent to the warehouse management system 2500 upon finding any suitable discrepancy between the items being staged and the item requested in the replenishment order. In the absence of any discrepancies, the inventory manager 2512 may send a prepare to replenish message to the warehouse management system 2500 indicating replenishment is to begin.

In accordance with the exemplary embodiments, the execution of a replenishment order may be substantially similar to the pallet order described above unless otherwise noted. It is noted however, that the flow of items (e.g. inflow of items) for the replenishment order is substantially opposite that of the pallet order (e.g. outflow of items). In one exemplary embodiment, there may be mixed SKUs on a pallet for a replenishment order. In another exemplary embodiment the pallet may include items having the same SKU. In yet another exemplary embodiment, the items in a replenishment order may be offloaded from the pallet in any suitable manner. For example, in one exemplary embodiment, the items may be offloaded in no particular order while in alternate embodiments the items may be offloaded in a particular sequence.

In a manner similar to that described above for the pallet order, the inventory manager 2512 may process the replenishment order in one or more phases. For exemplary purposes only, in one exemplary embodiment, the inventory manager 2512 may process the replenishment order in a transaction planning phase and a transaction execution phase. Transaction planning may include, for example, reserving storage slots on shelves 600 for the replenishment items, reserving inbound multilevel vertical conveyor resources for transferring the replenishment items to a predetermined storage structure level and generating one or more put away transactions for transferring the replenishment items to the storage shelves 600. In one exemplary embodiment, the transaction planning may be performed for the entire replenishment order, as a batch, before the first put away transaction is released for execution. In alternate embodiments, at least a portion of the transaction planning and transaction execution may occur simultaneously.

The number of planned transactions in a replenishment order may be calculated in any suitable manner by, for example, any suitable subsystem of the control server 120 such as the inventory manager 2512. In one exemplary embodiment, the number of transactions may be calculated by dividing the number of items to be depalletized by a standard (e.g. maximum) number of items per pickface for the specified SKU. The standard number of items per pickface may depend on the SKU-specific item dimensions, which determines how many items can fit depth-wise on the storage shelves 600. This division will produce the number of transactions with full pickfaces, plus, if there is a remainder, one additional transaction with the remainder number of cases in a less-than-full pickface.

For each planned transaction in a replenishment order, the inventory manager 2512 may submit a batch request to reserve storage slots for all of the pickfaces to be created by put-away transactions involved in the replenishment order. Based on the SKU's dimensions, the inventory manager first determines which levels can store the incoming items (e.g., levels for which the maximum allowable item height is greater than or substantially equal to the SKU's height). The inventory manager 2512 may obtain, from an available slots database located in, for example, the storage system 2400, a list of the available storage slots on eligible storage levels, along with the attributes for each slot such as slot length and location. The inventory manager 2512 may select and reserve one or more storage slots from the list of available slots to assign to the pickfaces that are created from the replenishment order. The allocation of shelf space (slots) to the storage of items (pickfaces), such as the dynamic allocation described above with respect to FIGS. 6A-6C, may provide one or more of spatial diversity of pickface locations, storage capacity utilization and optimized bot picking throughput. As described above, the size, number and location of the storage slots is variable (e.g. dynamically allocatable). For example, the spatial diversity may maximize the dispersion of pickfaces of a given SKU throughout the structure, both vertically in order to minimize scheduling conflicts at multilevel vertical conveyor transfer locations 2840A, 2840B (FIG. 7) on picking transactions, and horizontally in order to preserve pickface availability in the presence of exceptions (e.g. maintenance, closures, etc.) that prevent access to certain picking lanes. The storage capacity utilization may maximize storage density, i.e. the number of cases that can be stored within the picking structure, by minimizing wasted shelf-space as described above (FIGS. 6A-6C). Optimization of bot picking throughput may minimize bot travel time when executing picking tasks by storing faster moving SKUs closer to the transfer decks than slower moving SKUs.

The inventory manager 2512 may allocate storage slots to pickfaces by scoring each candidate storage slot on one or more of the following factors:

(a) Vertical dispersion—For a given slot, the smaller the number of existing pickfaces for the specified SKU on the same level (any aisle), the higher the score for this factor;

(b) Horizontal dispersion—A given slot receives a much higher score on this factor if there are fewer pickfaces for the specified SKU on the same aisle (at any level), than if there are many pickfaces on the same aisle at any level;

(c) Space utilization—For a given slot, the smaller the amount of available shelf area that will be wasted as a result of using the slot to store one of the planned pickfaces, the higher the score for this factor; and (d) Bot travel time—The distance of a slot from the nearest transfer deck is used to calculate a score that is inversely proportional to SKU velocity of movement. That is, the nearer the slot is to the transfer deck, the higher its score for a fast-moving SKU and the lower its score for slow-movers. Conversely, the farther the slot is from the transfer deck, the higher its score for a slow-moving SKU and the lower its score for fast-movers.

Allocation of the storage slots based on one or more of the above factors produces a value for each factor (the higher the value the more desirable the candidate shelf/slot for the transaction), and the values for all the factors are then weighted and summed to form a total score for each slot that is a candidate for use in storing a pickface in the replenishment order. The inventory manager 2512 may sort the scores to produce a relative ranking of the slots for selecting the required number of slots with the highest total scores and assigning each slot to a specific pickface. In alternate embodiments the allocation of storage slots may be performed in any suitable manner by any suitable subsystem(s) of, for example, the control server 120.

The inventory manager 2512, or any other suitable subsystem of the control server 120 may determine the relative sequence in which the items are to be delivered by a respective multilevel vertical conveyor 150A to respective levels of the storage structure 130. The inventory manager 2512 may maximize the time intervals between successive transactions at each respective in-feed transfer station 170 so that the bot 110 pick-up window for each item is maximized. It is noted that the in-feed transfer stations 170 fed by a given multilevel vertical conveyor 150A are always dedicated to a single replenishment order such that particular sequencing of items to the conveyors 150A is not needed.

The replenishment order process may generate a set of replenishment transactions, each transaction corresponding to a respective pickface, where the transactions indicate a unique pickface identification assigned by the inventory manager 2512 as part of the dynamic slot allocation process; the number of items that are to form the pickface and a corresponding set of unique item identifications, each of which is to be assigned to one of the items; the slot identification, location (e.g. level, aisle, shelf number, and reference slat number), and dimensions (e.g. length and depth); and the planned execution sequence number of the transaction. In alternate embodiments, the replenishment transactions may include any suitable information for identifying the items and the locations in which the items are to be stored.

The inventory manager 2512 (or other suitable subsystem of the control server 120) may be configured to perform the transaction execution in any suitable manner. It is noted that resource reservations, such as for the multilevel vertical conveyor shelves 730 and/or the in-feed transfer stations 170, may not be needed for transaction execution because each multilevel vertical conveyor 150A may be dedicated to servicing, for example, a single depalletizing station. In alternate embodiments, the multilevel vertical conveyors may serve more than one depalletizing station such that, for example, the inventory manager reserves system resources in a manner substantially similar to that described above for the fulfillment of pallet orders.

In one exemplary embodiment, one or more inspection stations 3010 may be located along the conveyor transferring items from the depalletizing station 210 to the in-feed transfer station 170. The inspection stations 3010 may be configured to receive inspection parameters including, but not limited to, predetermined item attributes (e.g. item dimensions, weight, SKUs, etc.). The inspection stations 3010 may be configured to sense, for example, the item attributes (e.g. size of the items, etc.) in any suitable manner as each item passes along the conveyor and compare them to the predetermined item attributes for a given SKU. The inspection station 3010 diverts items (e.g. rejected items) that do not meet the inspection parameters to a run-off area for manual inspection and resolution. The inspection station 3010 may be in communication with the control server 120 so the control server is informed of any rejected items. The inventory manager 2512 of the control server 120 in turn may notify the warehouse management system 2500 of any rejected items, reduce the number of items expected to be replenished in the storage and retrieval system 100, and modify the replenishment transaction to account for the rejected item(s).

In one example, where a rejected item is determined to satisfy a pick order to a predetermined SKU, but has different dimensions than those specified for the SKU, the inventory manager 2512, for example, may record the new dimensions for that particular item. The rejected item may be released back into the storage and retrieval system and the replenishment transactions may be updated accordingly to account for the newly determined case dimensions.

The inspection station 3010 may be configured to notify, for example, the inventory manager 2512 of each item that passes inspection as the items are transported to the in-feed transfer stations 170. The inventory manager 2512 assigns a unique identification number to each of the items, which is used to track the respective item within the storage and retrieval system.

The items are transferred from the in-feed transfer stations 170 to a bot 110 of a respective predetermined level 3000 of the storage structure 130 in a manner substantially opposite to that described above with respect to the pallet orders. The items may also be transferred to the respective predetermined storage location by the bots 110 in a manner substantially opposite to that described above with respect to the pallet orders.

Referring to FIGS. 1, 4 and 10-12 bot traffic management for bot 110 movement through, for example, the transfer deck 130B, picking aisles 130A and at the multilevel vertical conveyor transfer locations 2840A, 2840B (FIG. 7—where the bots 110 interface with the multilevel vertical conveyors) will be described. In one exemplary embodiment, the bot traffic may be managed on each storage level by, for example, a respective one of the level managers 2608 and/or bot proxies 2680 (FIG. 4A). In alternate embodiments the bot traffic may be managed in any suitable manner by any suitable components of the storage and retrieval system 100. Each of the level managers 2608 may include a reservation manager 2608A that is configured to reserve picking aisles 130A and/or multilevel vertical conveyor transfer locations 2840A, 2840B (or any other suitable resource available to the bot 110). Each of the level managers 2608 may also include a traffic controller 2608B. Any bot tasks that call for the bot 110 traversing, for example, the transfer deck 130B (or other suitable location) of a respective level are cleared for execution by the traffic controller 2608B. The bots 110 are configured to move autonomously on, for example, the transfer deck 130B such that a predetermined speed and separation distance from other bots 110 on the transfer deck 130B are maintained.

In operation, when a bot 110 is to enter a picking aisle 130A, the bot acquires a reservation for the picking aisle 130A. In one exemplary embodiment, a reservation for a picking aisle by one bot 110 (e.g. the reserving bot) may exclude other bots from operating in that picking aisle during the time reserving bot is traversing the reserved aisle. In another exemplary embodiment, multiple bots 110 may be allowed to reserve at least a portion of the same aisle so that multiple bots operate within the same aisle simultaneously. Reservations for bot travel in aisles of the multilevel vertical conveyor transfer locations 2840A, 2840B (FIG. 7) for interfacing with the multilevel vertical conveyors may be substantially similar to those for the picking aisles 130A. It is noted that the reservations may be granted based on a time an item to be picked is due at, for example, a respective multilevel vertical conveyor such that bots picking items with an earlier delivery time are given priority when reservations are granted.

In accordance with an exemplary embodiment, conflicts between reservations are substantially avoided in any suitable manner. For exemplary purposes only, bot traffic and corresponding reservations may be managed on a level by level basis so that operations on one level do not interfere with operations on another different level of the storage structure 130. Travel time on the transfer deck 130B by bots 110 may be restricted to a predetermined time period (e.g. the time it takes the bot to travel from an entrance point to the reserved exit point) to avoid excess travel and congestion of the transfer deck 130B. Conflicts between reservations for transfer station aisles (such as in multilevel vertical conveyor transfer locations 2840A, 2840B in FIG. 7) and picking aisles 130A may be substantially avoided by having a greater number of picking aisles 130A and multilevel vertical conveyor transfer locations 2840A, 2840B aisles on a level than a number of bots 110 on that level. Bots that cannot reserve a desired aisle may be provided with a different picking or replenishing job where if there are no other jobs available the bot may be sent to a vacant aisle so that it does not occupy an aisle reserved by another different bot or the transfer deck 130B.

Travel by bots 110 on the transfer deck may be organized so that bots 110 substantially do not enter a transfer deck 130B without having a reservation for a picking or transfer aisle where the bot 110 will exit the deck (e.g. so bots do not get trapped on the transfer deck without an exit point). Travel on the transfer deck may also be organized so that bots travel in the same direction while on the transfer deck 130B in a manner substantially similar to that of a revolving door. For example, the bots 110 traversing each segment of the transfer deck 130B travel around that segment at a predetermined speed and once a bot has an exit reservation the bot is assigned the next available corresponding segment of the transfer deck 130B for fulfilling that exit reservation.

In accordance with an exemplary embodiment, after a bot 110 picks an item(s) from a storage shelf 600, the bot 110 travels to the end of the picking aisle 130A and waits for clearance to enter the transfer deck 130B. The bot 110 may send a message to, for example the control server 120 requesting access to the transfer deck 130B. The control server 120, may be configured to track the location of the bots 110 on each respective level, through for example, wireless communications from the bots 110 as the bots 110 track their respective locations as described in, for example, U.S. patent application Ser. No. 12/757,312 previously incorporated by reference. The bots 110 location may be, for example continuously updated in any suitable database, such as for example, the mapping database 2603. In alternate embodiments, the position of each bot 110 may be tracked and recorded in any suitable manner. The control server 120 may use the bot location to determine a time slot for allowing the bot 110 to enter the transfer deck 130B while allowing the bots 110 previously traveling on the transfer deck 110 to operate at a predetermined speed without substantial slowing. The control server 120 may send a message to the bot 110 indicating the time slot for entering the transfer deck 130B.

As seen in FIGS. 11A and 11B, bots 110 entering the transfer deck 130B establish any suitable communications with one or more other bots 110 traveling on the transfer deck 130B. For example, bot 3210 may be travelling in front of bot 3200 on the transfer deck 130B. A communications link 3250 may be established between bots 3210, 3200 so that as the bots travel along the transfer deck 130B, bot 3210 substantially continuously sends, for example, its current position, speed, acceleration (or deceleration) and/or any other suitable information to the bot traveling behind it (e.g. bot 3200). Bot 3200 may use the information received from bot 3210 to adjust the speed of bot 3200 so that, for example, a predetermined travel distance is maintained between the bots 3210, 3200. A third bot, bot 3220 may be waiting to enter the transfer deck 130B in a predetermined time slot as described above. In this example, the bot 3220 enters the transfer deck 130B between bots 3200, 3210. Upon entering the transfer deck 130B, bot 3220 establishes communications with the bot 3200 directly behind it. The bots 3210, 3200 alter their communications so account for the entrance of bot 3220 onto the transfer deck 130B. In one example, when granting access to bot 3220 for entering the transfer deck 130B, the control server 120 may send messages to the bots 3210, 3200 already travelling on the transfer deck 130B that are affected by the entrance of bot 3220 for assigning the bots 3210, 3200 new communication endpoints (e.g. a message to bot 3210 to disconnect from bot 3200 and connect to bot 3220). In alternate embodiments, bot to bot communication may be performed in any suitable manner for allowing the bots to travel with each other on the transfer deck 130B.

FIG. 12 is another example illustrating two bots 3301, 3302 in picking aisles 3310, 3311 requesting access to the transfer deck 130B, two bots 3303, 3305 travelling around the transfer deck 130B and one bot 3304 on transfer aisle 3320 waiting to enter the transfer deck 130B. In this example, bot 3302 has performed a pick and is waiting to enter the transfer deck 130B. Bot 3301 is about to perform a pick, after which it will got to point G and wait to enter the transfer deck 130B. The control server 120 may allow bot 3302 to enter the transfer deck 130B before bot 3301 because, for example, bot 3305 may be to close to bot 3301 to allow bot 3301 to enter the transfer deck 130B without disrupting the flow of bots already on the transfer deck. The control server 120 may allow bot 3301 to enter the transfer deck after bot 3305 passes position G. Similarly the control server 120 may allow bot 3304 to enter the transfer deck 130B behind bot 3305. It is noted that the control server 120 may be configured for simultaneous communication with each bot 3301-3305 to allow bots to substantially simultaneously enter and exit the transfer deck 130B. In alternate embodiments, the control server may be configured to communicate with each bot in a sequential manner. For example, the control server 120 may communicate with each bot in an order in which communications from the bots 3301-3305 are received by the control server 120.

In one exemplary embodiment the control server 120 may include a storage and retrieval system emulator 100A (FIG. 4). In one exemplary embodiment, the system emulator 100A may be accessed through, for example, a user interface terminal 2410 for any suitable purpose. In another exemplary embodiment, the system emulator 100A may be used by the control server 120 to, for exemplary purposes only, plan for the execution of any suitable stage of the order fulfillment/replenishment processes described herein. The system emulator 100A may be configured to emulate the operations of any suitable component or combination of components (e.g. bots, multilevel vertical conveyor, bot transfer stations, in-feed/out-feed transfer stations, inspection stations, etc.) of the storage and retrieval system 100.

In one example, the system emulator 100A may include bot emulators that emulate the actions of one or more respective bots 110. The software of the bot emulator may be substantially the same as that found in, for example, the bot control system described in, for example, U.S. patent application Ser. No. 12/757,312 previously incorporated by reference. There may be stub implementations to mimic bot movement in response to bot instructions (e.g. without actual movement of the respective bot). The bot emulators may run in a placeholder bot environment and not on the actual bot. The placeholder bot environment may include a same host environment or a predefined host environment. In the same host environment, the control server 120 may initiate a predefined number of bot emulator processes on the same computers 120A, 120B (FIG. 2) the control server 120 is run on. In the predefined host environment the control server 120 may be configured to run the emulations on predetermined computers that act as one or more components of the control system 1220 of the bot 110 such as, for example, an on-board computer of the bot 110. The predetermined computers may be connected to the control server 120 in any suitable manner such as through, for example, wired or wireless connections. The control server 120 may perform substantially the same startup sequence and network communication protocols within the emulated bot environment as it would in a real bot environment. The emulated bot setup may expose deployment issues with the bots so that the issues may be fixed before the respective physical bots 110 are deployed. Similarly, the control system 120 may include, for example, multilevel vertical conveyor emulators, bot transfer station emulators, in-feed and out-feed transfer station emulators and incoming inspection station emulators. These emulators may be configured to exercise application program interfaces with the control server, emulate time latency of respective components of the storage and retrieval system and offer a way to inject random or controlled failures into the storage and retrieval system to exercise exception handling and their effects on system throughput. In alternate embodiments, the control server 120 may be configured to emulate any portion of the storage and retrieval system 100 in any suitable manner and for any suitable purpose.

It should be understood that the exemplary embodiments described herein may be used individually or in any suitable combination thereof. It should also be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A method for sequencing loads in an automated storage and retrieval system comprising:
    providing at least one elevated transfer deck for at least one autonomously guided bot transport, and a plurality of transfer locations disposed along the at least one elevated transfer deck;
    transporting, with the at least one autonomously guided bot transport, at least one load on the at least one elevated transfer deck for transfer by the at least one autonomously guided bot transport to a transfer location of the plurality of transfer locations; and
    providing a controller configured to generate a traverse loop for the at least one autonomously guided bot transport to traverse on the at least one elevated transfer deck to and from the transfer location;
    wherein, the controller generates a transport path and an alternate to the transport path for the at least one autonomously guided bot transport transporting the at least one load along the traverse loop to the transfer location, and
    wherein, with bot traverse of the transport path restricted, the controller selects the alternate that is different from traverse of the transport path, for the at least one autonomously guided bot transport transporting the at least one load along the traverse loop to the transfer location.

2. The method of claim 1, wherein the alternate bypasses a restriction of the transport path caused by another autonomously guided bot transport in the traverse loop.

3. The method of claim 1, wherein, with the bot traverse of the transport path restricted, the controller generates more than one alternate.

4. The method of claim 1, further comprising directing, with the controller, traverse of the traverse loop by the at least one autonomously guided bot transport via the transport path and the alternate, the controller further effecting a sequencing of transferring the at least one load and another load different from the at least one load at the transfer location.

5. The method of claim 1, further comprising:
    effecting a sequencing, with the controller, of transferring the at least one load and another load different from the at least one load at the transfer location; and
    the controller further directing traverse of the traverse loop by the at least one autonomously guided bot transport via the transport path and the alternate.

6. The method of claim 1, further comprising:
    determining with an inventory planning module of the controller, inventory levels at the end of at least one predetermined order fulfillment time period; and
    scheduling inventory replacement orders based on the determined inventory levels.

7. The method of claim 1, further comprising generating, with an order managing module of the controller, at least one pick transaction for removing at least one load from storage areas.

8. The method of claim 7, further comprising:
    determining, with the order managing module, the storage areas from which the loads are to be picked; and
    reserve reserving resources of the storage and retrieval system to effect transfer of the at least one load from the storage areas.

9. An automated storage and retrieval system comprising:
    at least one elevated transfer deck for at least one autonomously guided bot transport;
    a plurality of transfer locations disposed along the at least one elevated transfer deck;
    the at least one autonomously guided bot transport is configured to transport at least one load on the at least one elevated transfer deck for transfer by the at least one autonomously guided bot transport to a transfer location of the plurality of transfer locations; and
    a controller that is configured to generate a traverse loop for the at least one autonomously guided bot transport to traverse on the at least one elevated transfer deck to and from the transfer location;
    wherein, the controller generates a transport path and an alternate to the transport path for the at least one autonomously guided bot transport transporting the at least one load along the traverse loop to the transfer location, and
    wherein, with bot traverse of the transport path restricted, the controller selects the alternate that is different from traverse of the transport path, for the at least one autonomously guided bot transport transporting the at least one load along the traverse loop to the transfer location.

10. The system of claim 9, wherein the alternate bypasses a restriction of the transport path caused by another autonomously guided bot transport in the traverse loop.

11. The system of claim 9, wherein, with the bot traverse of the transport path restricted, the controller generates more than one alternate.

12. The system of claim 9, wherein the controller directs the traverse of the traverse loop by the at least one autonomously guided bot transport via the transport path and the different alternate so as to effect a sequence of transferring the at least one load and another load different from the at least one load at the transfer location.

13. The system of claim 9, wherein the controller effects a sequencing of a transfer of the at least one load and another load different from the at least one load at the transfer location by directing traverse of the traverse loop by the at least one autonomously guided bot transport via the transport path and the alternate.

14. The system of claim 9, wherein the controller further includes an inventory planning module configured to:
- determine inventory levels at the end of at least one predetermined order fulfillment time period, and
- schedule inventory replacement orders based on the determined inventory levels.

15. The system of claim 9, wherein the controller further includes an order managing module configured to generate at least one pick transaction for removing at least one load from storage areas.

16. The system of claim 15, wherein the order managing module is configured to:
- determine the storage areas from which the loads are to be picked, and
- reserve resources of the storage and retrieval system to effect transfer of the at least one load from the storage areas.

* * * * *